United States Patent
Abe et al.

(10) Patent No.: US 7,434,086 B2
(45) Date of Patent: Oct. 7, 2008

(54) FUNCTIONAL DEVICE, FUNCTION MAINTAINING METHOD AND FUNCTION MAINTAINING PROGRAM

(75) Inventors: Jin Abe, Kawasaki (JP); Hirokazu Fukui, Kawasaki (JP); Kazuhiro Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 567 days.

(21) Appl. No.: 11/023,011

(22) Filed: Dec. 28, 2004

(65) Prior Publication Data

US 2006/0036912 A1    Feb. 16, 2006

(30) Foreign Application Priority Data

Aug. 16, 2004    (JP)   ............... 2004-236803

(51) Int. Cl.
     *G06F 11/00*    (2006.01)
(52) U.S. Cl. .......................................................... 714/2
(58) Field of Classification Search ..................... 714/2, 714/7, 8, 11, 13
See application file for complete search history.

(56) References Cited

U.S. PATENT DOCUMENTS

| | | | |
|---|---|---|---|
| 5,655,069 A | | 8/1997 | Ogawara |
| 5,699,504 A | * | 12/1997 | Mano .......................... 714/13 |
| 5,861,882 A | * | 1/1999 | Sprenger et al. ............. 715/700 |
| 6,205,562 B1 | * | 3/2001 | Fukushima et al. ........... 714/43 |
| 6,330,587 B1 | * | 12/2001 | Tedone et al. ................ 709/201 |
| 6,378,021 B1 | * | 4/2002 | Okazawa et al. ............. 710/317 |
| 7,085,960 B2 | * | 8/2006 | Bouat et al. ................... 714/13 |
| 2005/0075824 A1 | * | 4/2005 | Lee ............................. 702/130 |
| 2005/0204243 A1 | * | 9/2005 | Hu et al. ...................... 714/742 |

FOREIGN PATENT DOCUMENTS

| | | |
|---|---|---|
| JP | 08-044581 | 2/1996 |
| JP | 09-062528 | 3/1997 |

* cited by examiner

*Primary Examiner*—Nadeem Iqbal
(74) *Attorney, Agent, or Firm*—Arent Fox LLP.

(57) ABSTRACT

This invention relates to a functional device such as an FPGA carrying out a necessary function by programming, and provides a functional device, a function maintaining method and a function maintaining program which can maintain a function continuously. A plurality of function parts (FPGAs) is provided, and a function is maintained by switching from a function part, in which a failure is occurring, to a function part under stand-by. The plurality of function parts, a failure detection part (failure detection circuits) and a switching part (switching circuits) are provided, and a function part under operation and a function part under stand-by a reset. That is, the function part in which the failure is occurring is made into a stand-by state, and the function part which is under stand-by is made to operate. Therefore, the continuous function can be maintained without stopping the operation of a system due to the failure occurring in the function part, and the reliability of the system is heightened by the maintenance of the function.

20 Claims, 18 Drawing Sheets

FUNCTIONAL DEVICE, FUNCTION MAINTAINING METHOD AND FUNCTION MAINTAINING PROGRAM

BACKGROUND OF THE INVENTION

1. Field of the Invention

The present invention relates to a functional device such as an FPGA (Field Programmable Gate Arrays) which carries out a necessary function by programming. In particular, the present invention relates to a functional device, a function maintaining method and a function maintaining program which overcome a fault such as a software error and can achieve maintenance of a continuous function.

2. Description of the Related Art

As is well known, the FPGA is an integrated circuit device in which circuit information inside the device can be written electrically by a program given from an outside, and which carries out a necessary circuit function by that circuit information.

Such an FPGA has a RAM (Random-Access Memory) for the purpose of maintaining the circuit information, and, for this RAM, an SRAM (Static RAM) is used. In the SRAM, the quantity of an individual electric charge is becoming small with the low voltage of a supply voltage and the minuteness of an integrated circuit in recent years. Because of this, there is some fear that a software error occurs. If the circuit information which has been written is changed by some electrical cause such as a software error, abnormality occurs in circuit behavior of the FPGA. In order to make a normal function recover, it is necessary to stop a system and to correct memory contents of the SRAM provided inside the FPGA. That is, it is necessary to rewrite the circuit information.

By the way, as patent documents which disclose in regard to the FPGA and the recovery of its function, the Japanese Laid Open Publications No. H09-62528 and No. H08-44581 are in existence.

As described above, in case in which the circuit information written in the FPGA is changed by some electrical cause such as a software error, the correction of the memory contents of the SRAM or the rewriting of the SRAM becomes necessary in order to recover a function of the FPGA. However, in such processing, a temporary stoppage and a restart of the system must be performed, for example. This is troublesome.

By the way, in the publication No. H09-62528, enabling self-recovery during service or during use after forwarding a functional device is disclosed. That is, as a functional device, for example, functional components and packaged devices are provided over a plurality of systems in parallel. One system out of those systems is used, the other system is made into a backup system at the time of a fault, and the backup system executes a function as proxy when a fault occurs in the system under use. Further, the publication No. H09-62528 discloses that an integrated circuit device is used as the functional device, and an FPGA is exemplified as the integrated circuit device. In this FPGA, the detection and decision of fault occurrence are disclosed, and, further, the recovery of a function executed based on that is also disclosed.

However, in the self-recovering device disclosed in the publication No. H09-62528, a functional component or a packaged device which presents a functional fault can not carry out self-recovery in essence. Because of this, when the backup system is used, the system which has presented a fault can not be used as a backup system. Further, in case in which only one backup system is provided, the state of non-redundant operation without a backup system is caused at the time of the occurrence of a fault. Furthermore, also in case in which a plurality of backup systems are in existence, the backup systems are reduced in number if a fault occurs. It is disclosed that prompt repair is needed in order to avoid such a state, and therefore imperfection of providing the backup system is indicated.

In addition, this self-recovering device has a functional circuit part, a fault detection part, an internal memory, a definition processing part and so on. The internal memory stores a plurality of pieces of layout pattern definition information which defines a function for the purpose of realizing a function of the functional circuit part. Based on the discriminated result of a fault area from the fault detection part, the definition processing part re-defines the functional circuit part in accordance with definition information not including a divided area, in which a fault is generated, from the layout pattern definition information stored in the internal memory. By such a constitution, the self-recovering device realizes a functional recovery by self-restoration and nothing more.

On the other hand, the publication No. H08-44581 discloses on an information processing device with a self-repairing function. This publication only discloses that the information processing device is constituted by providing a plurality of FPGAs and thereby the FPGAs are re-constituted based on the occurrence of a fault.

SUMMARY OF THE INVENTION

The present invention relates to a functional device such as an FPGA carrying out a necessary function by programming, and an object of the present invention is to provide a functional device, a function maintaining method and a function maintaining program which can maintain a function continuously.

Another object of the present invention is to prevent the stop of behavior against the occurrence of a failure such as a software error.

Still another object of the present invention is to recover a function against the occurrence of a failure such as a software error as a normal function is continued.

In order to attain the above objects, a first featured matter of a functional device according to the present invention is that a plurality of function parts are provided and a function is maintained by switching from a function part, in which a failure is occurring, to a function part under stand-by. That is, the plurality of function parts, a failure detection part and a switching part are provided. The function parts are a constitution which carries out a necessary function by circuit information written therein. By a function part being formed by the plurality of function parts, a function part under operation and a function part under stand-by can be set. The failure detection part detects the occurrence of a failure of the function part under operation out of the function parts. Then, the switching part switches from the function part, in which a failure is occurring, to the function part under stand-by based on the detection of the failure by the failure detection part. That is, the function part in which the failure is occurring is made to stand by, and the function part which is in a stand-by state is made to operate. Therefore, it is possible to continuously maintain the function without stopping the operation of a system due to the failure occurring in the function part. Because of this, the reliability of the system is heightened by the maintenance of the function.

In order to attain the above objects, a second featured matter of a function device according to the present invention is to make a function of the function part with the failure recover. That is, giving a constitution which has a function recovery part recovering the function of the above-mentioned function part with the failure, it is possible to make the above-mentioned function part with the failure recover by the function recovery part and to make this function part providing a normal function stand by for next operation, by removing the function part with the failure from an active system. This enables the function device to maintain a continuous and normal function.

In order to attain the above objects, a third featured matter of a functional device according to the present invention has a plurality of function parts, and is to maintain a function by periodically removing a function part under operation from an active system and by making a function part under stand-by return to the active system. That is, the plurality of function parts, a switching timing detection part and a switching part are provided. As described before, the function parts are a constitution which carries out a necessary function by circuit information written therein, and by a function part being formed by the plurality of function parts, a function part under operating and a function part under stand-by can be set. The switching timing detection part detects switching timing for the purpose of switching from the function part under operation to the function part under stand-by out of these function parts. Further, based on the above-mentioned switching timing which is detected by the switching timing detection part, the switching part makes the function part under operation stand by, and makes the above-mentioned function part under stand-by return to the active system. Therefore, since the operation of a system is executed by switching the plurality of function parts without stopping the operation of the system, a continuous function can be maintained. By this, the improvement of the reliability of the system is given as compared with the continuous use of a single function part.

In order to attain the above objects, the functional device of the present invention may also be constituted so that the functional device has a rewriting part which rewrites the above-mentioned circuit information into the function part under stand-by.

In order to attain the above objects, a functional device of the present invention may also be constituted so that the functional device has a plurality of function parts, a failure detection part, a switching timing detection part and a switching part. The function parts carry out a necessary function by circuit information written therein. The failure detection part detects a failure of a function part under operation out of these function parts. The switching timing detection part detects switching timing for the/purpose of switching from the function part under operation to a function part under stand-by out of the above-mentioned function parts. The switching part makes the above-mentioned function part under operation stand by and makes a function part under stand-by operate in case in which the above-mentioned switching timing comes, and switches from the function part with the failure to a function part under stand-by by detection of the failure.

In order to attain the above objects, a functional device of the present invention may also be constituted so that the functional device has a plurality of function parts, an input data maintaining part, an input switching part, an output switching part and an output data maintaining part. The plurality of function parts carry out a necessary function by circuit information written therein. The input data maintaining part maintains an input data which is applied to the above-mentioned function parts. The input switching part switches input of the above-mentioned input data, which is maintained in the input data maintaining part, toward the above-mentioned function parts. The output switching part switches taking-out of an output data which is taken out from the above-mentioned function parts. The output data maintaining part maintains the above-mentioned output data which is taken out from the function parts.

In order to attain the above objects, the functional device of the present invention may also be constituted so that a failure detection part which detects a failure of the above-mentioned function part under operation is provided, and so that either the above-mentioned input switching part or the above-mentioned output switching part is switched or both of them are switched based on detection of the failure of the failure detection part.

Further, in order to attain the above objects, a function maintaining method of the present invention is a constitution which includes processing that selects at least one function part from a plurality of function parts carrying out a necessary function by circuit information written therein and makes it operate, processing that detects a failure of the above-mentioned function part under operation, and processing that switches from the function part, in which the failure is occurring, to a function part under stand-by base on detection of the above-mentioned failure. This function maintaining method corresponds to the first featured matter of the functional device of the present invention described before. Also by such processing, it is possible to continuously maintain the function without stopping the operation of a system due to the failure occurring in a function part. Because of this, the reliability of the system is heightened by the maintenance of the function.

In order to attain the above objects, the function maintaining method of the present invention may also be constituted so that the method includes processing that recovers a function of the above-mentioned function part in which the failure is occurring.

In order to attain the above objects, a function maintaining method of the present invention may also be constituted so that the method includes processing that selects at least one function part from a plurality of function parts carrying out a necessary function by circuit information written therein and makes it operate, processing that detects switching timing for the purpose of switching from the function part under operation to a function part under stand-by out of these function parts, and processing that makes the above-mentioned function part under operation stand by and makes a function part under stand-by operate based on the above-mentioned switching timing.

In order to attain the above objects, a function maintaining method of the present invention may also be constituted so that the method has processing that selects at least one function part from a plurality of function parts carrying out a necessary function by circuit information written therein and makes it operate, processing that detects a failure of the above-mentioned function part under operation, processing that detects switching timing for the purpose of switching from the above-mentioned function part under operation to a function part under stand-by, and processing that makes the above-mentioned function part under operation stand by and makes a function part under stand-by operate in case in which the above-mentioned switching timing comes, and switches from the function part, in which the failure is occurring, to a function part under stand-by based on detection of the above-mentioned failure.

In order to attain the above objects, a function maintaining method of the present invention may also be constituted so that the method includes processing that selects at least one function part from a plurality of function parts carrying out a necessary function by circuit information written therein and makes it operate, processing that maintains an input data which is given to the above-mentioned function part, and processing that maintains an output data which is taken out from the above-mentioned function part.

Further, in order to attain the above objects, a function maintaining program of the present invention is a program which makes a computer execute the following steps, and is a constitution which includes a step that selects at least one function part from a plurality of function parts carrying out a necessary function by circuit information written therein and makes it operate, a step that takes in information representative of a failure which occurs in the above-mentioned function part under operation, and a step that switches from the function part, in which the failure is occurring, to a function part under stand-by. Also by such a program, it is possible to continuously maintain the function without stopping the operation of a system due to the failure occurring in a function part. Because of this, the reliability of the system is heightened by the maintenance of the function.

In order to attain the above objects, the function maintaining program of the present invention may also be constituted so that the program includes a step that makes a function of the above-mentioned function part with the failure recover.

In order to attain the above objects, a function maintaining program of the present invention is a program which makes a computer execute the following steps, and may also be constituted so that the program includes a step that selects at least one function part from a plurality of function parts carrying out a necessary function by circuit information written therein and makes it operate, a step that takes in switching timing for the purpose of switching from the function part under operation to a function part under stand-by out of these function parts, and a step that makes the above-mentioned function part under operation stand by and makes a function part under stand-by operate based on the above-mentioned switching timing.

In order to attain the above objects, a function maintaining program of the present invention is a program which makes a computer execute the following steps, and may also be constituted so that the program includes a step that selects at least one function part from a plurality of function parts carrying out a necessary function by circuit information written therein and makes it operate, a step that takes in information representative of a failure which occurs in the above-mentioned function part under operation, a step that detects switching timing for the purpose of switching from the above-mentioned function part under operation to a function part under stand-by, and a step that makes the above-mentioned function part under operation stand by and makes a function part under stand-by operate in case in which the above-mentioned switching timing comes, and switches from the function part, in which the failure is occurring, to a function part under stand-by based on detection of the above-mentioned failure.

As described above, in the present invention, at least one out of a plurality of function parts which carry out a necessary circuit function by rewriting circuit information is made into an active system, and the other or the others are made into a stand-by system. Then, the function parts are switched to an active system or a stand-by system periodically, or, in case in which a failure occurs in a function part of the active system, a function part of the stand-by system is made into the active system. Further, the function of a function part which is shifted to the stand-by system is guaranteed or recovered by the execution of configuration processing. Because of this, the continuous maintenance of a function becomes possible. By this, the present invention can contribute to the improvement of the reliability of a system, and is useful.

Furthermore, enumerating the featured matters and advantages of the present invention, these are as in the following.

(1) A plurality of function parts which execute a necessary circuit function by writing of circuit information are provided, and switching from a function part with a failure to a function part under stand-by is performed. Because of this, the present invention can continuously maintain the function without stopping a system due to the occurrence of a failure, and the reliability of the system can be improved.

(2) Giving a constitution which makes the function of a function part with a failure recover, it is possible to maintain a function part under stand-by in a normal state. By this, the continuation of functional maintenance is improved, and the reliability of a system can be heightened.

(3) The present invention has a plurality of function parts which carry out a necessary circuit function by writing of circuit information, and switches periodically from a function part under operation to a function part under stand-by. Because of this, it is possible to continuously maintain a function, and it is possible to improve the reliability of a system.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE PREFERRED EMBODIMENTS

First Embodiment

Figure 1:
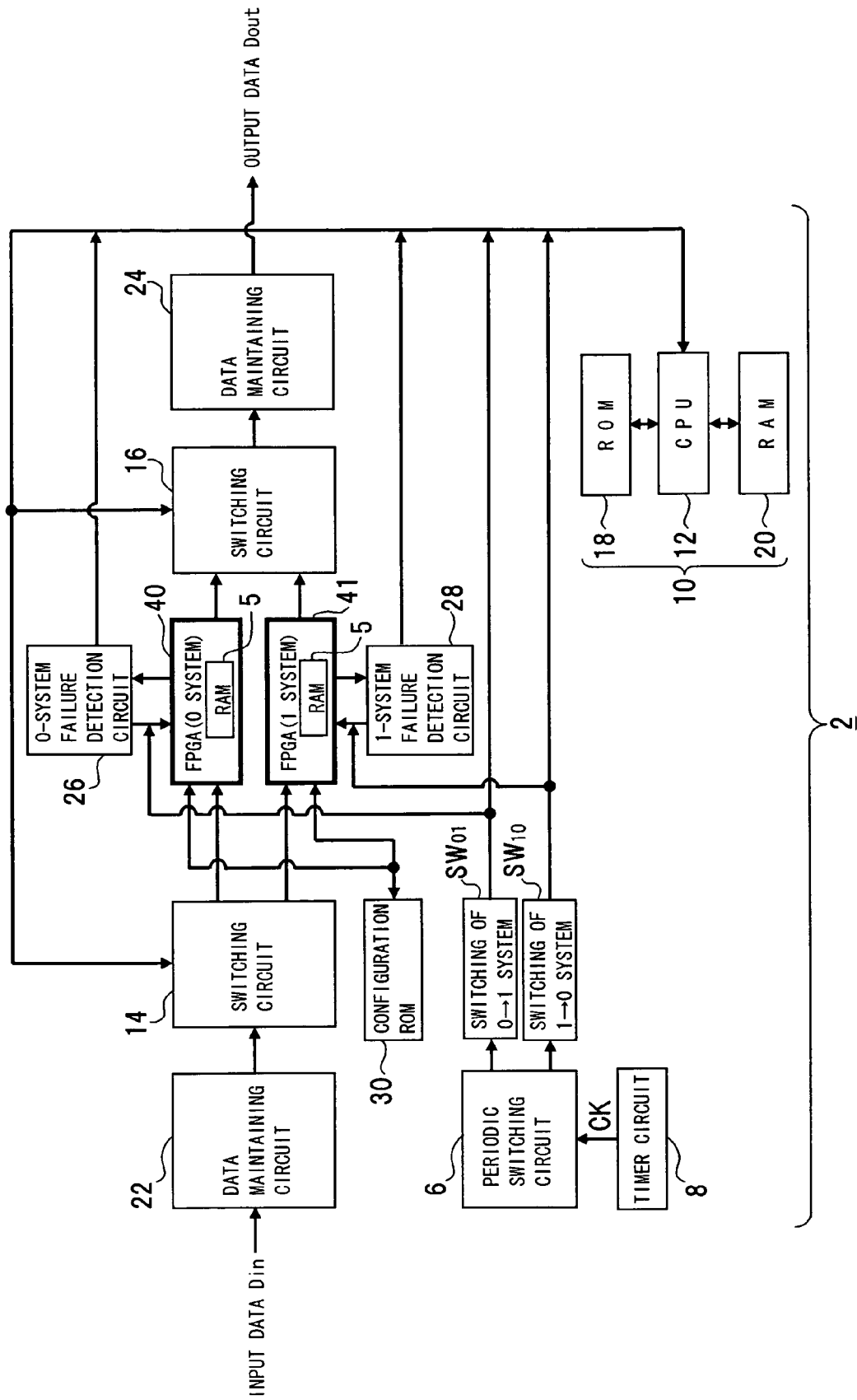
FIG. 1 is a block diagram showing a functional device according to a first embodiment of the present invention.
Figure 2:
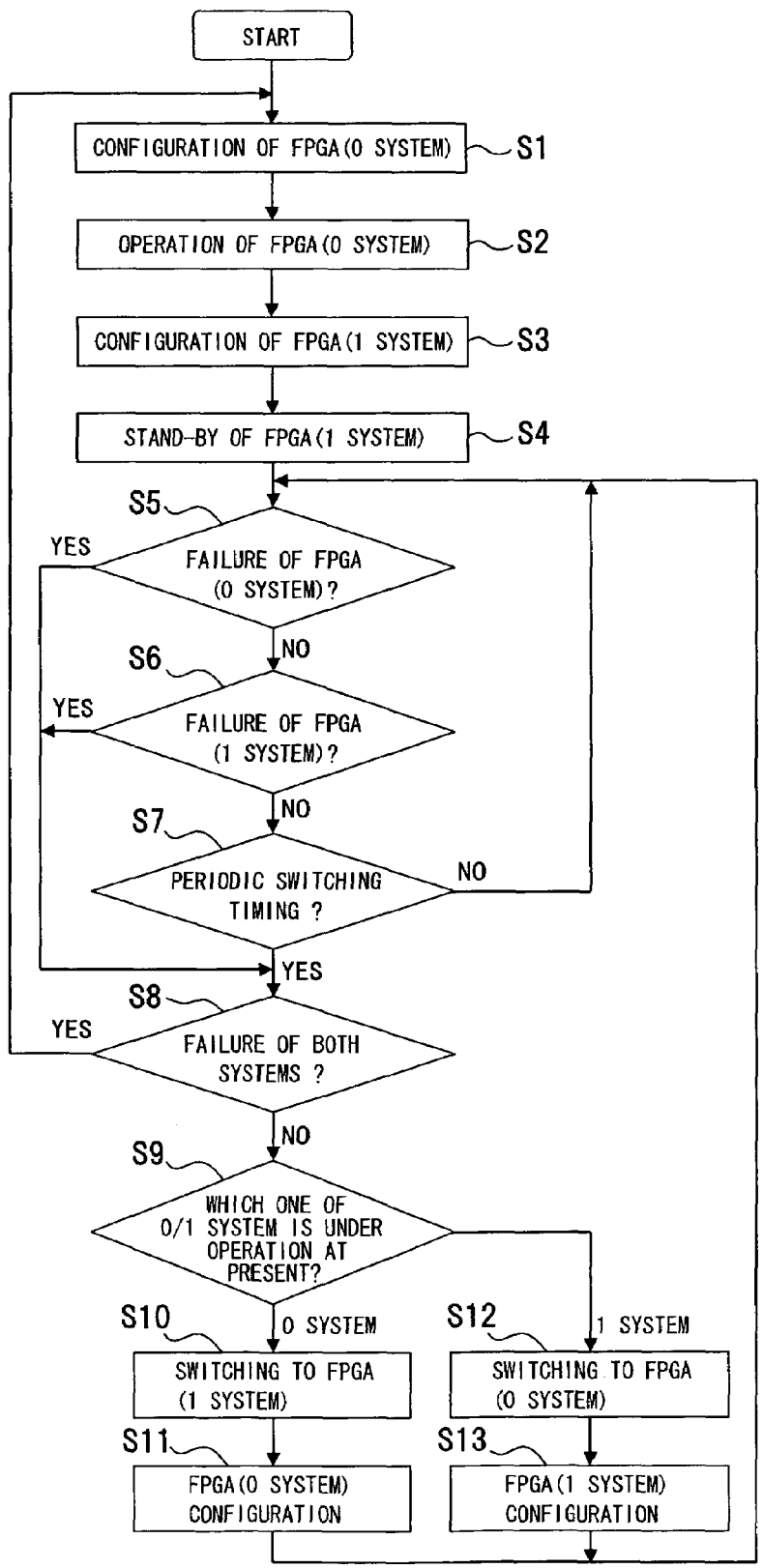
FIG. 2 is a flow diagram showing operation of the functional device, a function maintaining method and a function maintaining program according to the first embodiment of the present invention.

A first embodiment of the present invention is explained by referring to FIG. 1 and FIG. 2. FIG. 1 shows a functional device according to the first embodiment of the present invention, and FIG. 2 shows a function maintaining method and a function maintaining program according to the first embodiment of the present invention.

In this functional device 2, as a plurality of function parts which carry out a necessary circuit function by programming, a first FPGA (Field Programmable Gate Arrays) 40 and a second FPGA (Field Programmable Gate Arrays) 41 are provided. Here, the FPGAs 40 and 41 are a device able to rewrite circuit information electrically, and are a programmable integrated circuit device which carries out a necessary circuit function by the circuit information written therein. That is, each of the FPGAs 40 and 41 has a RAM (Random-Access Memory) 5 as a function storage part able to write the circuit information, for example. Further, similarly to the FPGAs 40 and 41, the functional device 2 serving as a system including the FPGAs 40 and 41 is also constituted as an integrated circuit device. That is, this functional device 2 is a doubled constitution of FPGAs, which has the two FPGAs 40 and 41. By making one of these FPGAs 40 and 41 operate and making the other stand by, periodically, and by making an FPGA under stand-by operate instead of an FPGA under operation in case in which a failure occurs in the FPGA under operation, the functional device 2 realizes a continuous function. In this embodiment, for the sake of convenience of explanation, the FPGA 40 is represented as a 0 (zero) system, and the FPGA 41 is represented as a 1 (one) system. An FPGA which is in a relation of co-operation with a system including the functional device 2 is represented as an active (ACT) system or as "under operation", and an FPGA which is out of the relation of co-operation and is stood by is represented as a stand-by (SBY) system or as "under stand-by".

Therefore, this functional device 2 has a constitution which switches alternately periodically one of the FPGAs 40 and 41 to the active system and the other to the stand-by system, and a constitution which continues a function by switching the active system with a failure to a stand-by state and by switching the FPGA 40 or the FPGA 41 under stand-by to the active system in case in which the failure occurs in the FPGA 40 or the FPGA 41 of the active system.

As a constitution which switches periodically one of the FPGAs 40 and 41 to effectiveness and the other to invalidity, a periodic switching circuit 6 serving as a switching timing detection part which detects switching timing of the FPGAs 40 and 41 is provided. This periodic switching circuit 6 receives a clock signal CK from a timer circuit 8, detects the switching timing by timer operation, and generates a switching signal SW. As for the switching signal SW, since the FPGAs 40 and 41 are alternately switched, the periodic switching circuit 6 generates a switching signal $SW_{01}$ in case of switching from the FPGA 40 under operation to the FPGA 41 under stand-by (switching of 0→1 system), and generates a switching signal $SW_{10}$ in case of switching from the FPGA 41 under operation to the FPGA 40 under stand-by (switching of 1→0 system)

These switching signals $SW_{01}$ and $SW_{10}$ are given to a CPU (Central Processing Unit) 12 of a control part 10, the FPGAs 40 and 41 and switching circuits 14 and 16, and are representative of generation of the switching timing. Along with this, the switching signals $SW_{01}$ and $SW_{10}$ act as a reset signal to the FPGAs 40 and 41, and act as a switching signal to the switching circuits 14 and 16. The control part 10 has the CPU 12, a ROM (Read-Only Memory) 18, a RAM (Random-Access Memory) 20 and so on, and is a computer which executes information processing. The control part 10 controls sequential operation of all systems of the functional device 2. In this case, taking-in of the switching signals $SW_{01\ and\ SW10}$ taken in the CPU 12 and switching states of the switching circuits 14 and 16 are stored in the RAM 20. In the ROM 18, a program for the purpose of executing information processing like this is stored.

Further, the switching circuit 14 is provided at a data input side of the FPGAs 40 and 41, and the switching circuit 16 is provided at a data output side of these. The switching circuits 14 and 16 constitute first and second switching parts which switch one of the FPGAs 40 and 41 to the active system and switch the other to the stand-by system. The switching circuit 14 switches an input data $D_{in}$ to the FPGA 40 or the FPGA 41 with arrival of the switching signal $SW_{01}$ or $SW_{10}$ as a trigger. For example, if the switching signal $SW_{01}$ arrives, the FPGA 40 of the active system comes into the stand-by system, and the FPGA 41 of the stand-by system is to be switched to the active system. On the other hand, if the switching signal $SW_{10}$ arrives, the FPGA 41 of the active system comes into the stand-by system, and the FPGA 40 of the stand-by system is to be switched to the active system. Further, the switching circuit 16 switches the taking-out of an output data $D_{out}$ with arrival of the switching signal $SW_{01}$ or $SW_{10}$ as a trigger. For example, if the switching signal $SW_{01}$ arrives, the FPGA 40 of the active system comes into the stand-by system, and the FPGA 41 of the stand-by system is to be switched to the active system. On the other hand, if the switching signal $SW_{10}$ arrives, the FPGA 41 of the active system comes into the stand-by system, and the FPGA 40 of the stand-by system is to be switched to the active system. Because of this, the input data $D_{in}$ and the taking-out of the output data $D_{out}$ are to be switched at the same time with the arrival of the switching signal $SW_{01}$ or $SW_{10}$ as a trigger. By this, either the FPGA 40 or the FPGA 41 is switched to the active system or the stand-by system, the input data $D_{in}$ is given to the FPGA 40 or 41 of the active system, and the taking-out of the output data $D_{out}$ corresponding to the input data $D_{in}$ is carried out.

Further, at a forward stage of the switching circuit 14, a data maintaining circuit 22 which maintains the input data $D_{in}$ is provided. At a backward stage of the switching circuit 16, a data maintaining circuit 24 which maintains the output data $D_{out}$ is provided. These data maintaining circuits 22 and 24 maintain a corresponding data for a predetermined time, and update the maintained data by the lapse of time. That is, in the data maintaining circuit 22, the input data $D_{in}$ which is given to the FPGA 40 or 41 of the active system through the switching circuit 14 is maintained. In the data maintaining circuit 24, the output data $D_{out}$ which is taken out from the FPGA 40 or 41 of the active system through the switching circuit 16 is maintained. By data maintenance like this, it is possible to prevent a lack of the input data $D_{in}$ or the output data $D_{out}$ due to switching of the FPGAs 40 and 41 described before.

Further, as a constitution which performs switching with failure occurrence of the FPGA 40 or 41 as a trigger, a 0-system failure detection circuit 26 serving as a failure detection part which detects the occurrence of a failure is provided in regard to the FPGA 40, and a 1-system failure detection circuit 28 serving as a failure detection part which detects the occurrence of a failure is provided in regard to the FPGA 41. The 0-system failure detection circuit 26 detects a failure concerning the FPGA 40 of the active system. For example, the 0-system failure detection circuit 26 detects operating abnormality caused by some electrical cause, for example, a software error of circuit information written in the FPGA 40, and generates a failure detection signal. Similarly, the 1-system failure detection circuit 28 detects a failure concerning the FPGA 41 of the active system. For example, the 1-system failure detection circuit 28 detects operating abnormality caused by some electrical cause, for example, a software error of circuit information written in the FPGA 41, and generates a failure detection signal.

The failure detection signal generated by the 0-system failure detection circuit 26 or the 1-system failure detection circuit 28 is given to the CPU 12, the FPGAs 40 and 41 and the switching circuits 14 and 16, and is representative of failure occurrence. Along with this, the failure detection signal acts as a reset signal to the FPGAs 40 and 41, and acts as a switching signal to the switching circuits 14 and 16. That is, in case in which the 0-system failure detection circuit 26 detects a failure, the FPGA 40 is reset and is switched from the active system to the stand-by system. Along with this, by switching the switching circuits 14 and 16, the input data $D_{in}$ is given to the FPGA 41 of the stand-by system, and its output data $D_{out}$ is taken out. On the other hand, in case in which the 1-system failure detection circuit 28 detects a failure, the FPGA 41 is reset and is switched from the active system to the stand-by system. Similarly, by switching the switching circuits 14 and 16, the input data $D_{in}$ is given to the FPGA 40 of the stand-by system, and its output data $D_{out}$ is taken out.

Furthermore, as a storage part which stores circuit information to be written in each of the FPGAs 40 and 41, a Configuration ROM 30 (hereinafter represented as "ROM 30") is provided. This ROM 30 is used for the initialization of each of the FPGAs 40 and 41. Along with this, the ROM 30 constitutes a function recovery part on a point that the ROM 30 recovers a function of the FPGA 40 or 41 in which a failure is occurring, and constitutes a rewriting part on a point that the ROM 30 rewrites the circuit information. This embodiment is a constitution in which rewriting of the circuit information is performed from the ROM 30 to the FPGA 40 or 41 of the stand-by system by failure occurrence or periodic switching.

In such a constitution, the periodic switching circuit 6 forms the switching signal $SW_{01}$ or $SW_{10}$ based on the clock signal CK from the timer circuit 8. The switching circuits 14 and 16 are switched by the switching signal $SW_{01}$ or $SW_{10}$. Along with this, by the switching signal $SW_{01}$, the FPGA 40 is reset and comes into the stand-by system, and the FPGA 41 is also switched to the active system. On the other hand, by the switching signal $SW_{10}$, the FPGA 41 is reset and comes into the stand-by system, and the FPGA 40 is also switched to the active system. As a result, the FPGAs 40 and 41 are switched to the active system or the stand-by system selectively. This switching is executed every predetermined time which is set to the switching signals $SW_{01}$ and $SW_{10}$, for example, every twelve hours.

For example, assuming that the FPGA 40 is in the active system and the FPGA 41 is in the stand-by system, the input data $D_{in}$ is given to the FPGA 40, and the output data $D_{out}$ is taken out from the FPGA 40. In this case, the input data $D_{in}$ is maintained in the data maintaining circuit 22 and is given to the FPGA 40 through the switching circuit 14, and the output data $D_{out}$ of the FPGA 40 is maintained in the data maintaining circuit 24 through the switching circuit 16 and is output. Similarly, assuming that the FPGA 41 is in the active system and the FPGA 40 is in the stand-by system, the input data $D_{in}$ is given to the FPGA 41, and the output data $D_{out}$ is taken out from the FPGA 41. In this case, the input data $D_{in}$ is maintained in the data maintaining circuit 22 and is given to the FPGA 41 through the switching circuit 14, and the output data $D_{out}$ of the FPGA 41 is maintained in the data maintaining circuit 24 through the switching circuit 16 and is output.

Then, the circuit information is given to the FPGA 40 or the FPGA 41, which is shifted to the stand-by system, from the ROM 30, and, after the rewriting of the circuit information is performed as configuration processing, its stand-by state is maintained.

Further, in addition to the above-mentioned periodic switching, if a failure occurs in the FPGA 40 under operation and this failure is detected by the 0-system failure detection circuit 26, the switching signal is output from the 0-system failure detection circuit 26. By this switching signal, the FPGA 40 is reset, and the switching circuits 14 and 16 are also switched to the FPGA 41 side. As a result, the FPGA 40 comes into the stand-by system, and the FPGA 41 comes into the active system. By this, the input data $D_{in}$ is given to the FPGA 41, and the output data $D_{out}$ is taken out from this FPGA 41.

On the other hand, if a failure occurs in the FPGA 41 under operation and this failure is detected by the 1-system failure detection circuit 28, the switching signal is output from the 1-system failure detection circuit 28. By this switching signal, the FPGA 41 is reset, and the switching circuits 14 and 16 are also switched to the FPGA 40 side. As a result, the FPGA 41 comes into the stand-by system, and the FPGA 40 comes into the active system. By this, the input data $D_{in}$ is given to the FPGA 40, and the output data $D_{out}$ is taken out from this FPGA 40.

Then, since the failure is occurring, the circuit information is given to the FPGA 40 or the FPGA 41, which is shifted to the stand-by system, from the ROM 30. By this, the writing of the circuit information is performed as the configuration processing, and, after recovery of the function, its stand-by state is maintained.

Like this, the FPGAs 40 and 41 are provided as a plurality of function parts, and one of these is switched to the active system and the other is switched to the stand-by system, periodically. Further, the configuration processing is given to the FPGA 40 or 41 of the stand-by system. Furthermore, the occurrence of a failure in the FPGA 40 or 41 of the active system is observed, the FPGA 40 or 41 which is in the failure is switched to the stand-by system, and the configuration processing is given to the FPGA 40 or 41 of the stand-by system and it is made to stand by. Because of this, the function is continuously maintained, and the reliability of the system is heightened.

Next, with this functional device 2 as a premise, a function maintaining method and a function maintaining program are explained by referring to FIG. 2.

By impressing a power source, all systems of the functional device 2 are shifted to an operating state, and, as initialization processing of the FPGAs 40 and 41, configuration processing of the FPGA 40 is executed (a step S1). As a result of this processing, the FPGA 40 comes into the active system (a step S2). Receiving a shift to the active system of the FPGA 40, configuration processing of the FPGA 41 is executed (a step S3). As a result of this processing, the FPGA 41 comes into the stand-by system (a step S4). In the configuration processing of the FPGAs 40 and 41, circuit information is given to the FPGAs 40 and 41 from the ROM 30, and the circuit information which is read from the ROM 30 is written in the internal RAM 5.

After the above-mentioned configuration processing, as operation processing of the FPGAs 40 and 41, either one of the FPGAs 40 and 41 is set to active system and the other is set to the stand-by system by the switching signal $SW_{01}$ or $SW_{10}$ of the periodic switching circuit 6. As a result of this, the input data $D_{in}$ is given to the FPGA 40 or the FPGA 41 under operation, and the output data $D_{out}$ is taken out from the FPGA 40 or the FPGA 41 under operation.

In connection with these FPGAs 40 and 41 which are in the active system or in the stand-by system, whether or not a failure is occurring is decided by the outputs of the 0-system failure detection circuit 26 and the 1-system failure detection circuit 28. That is, whether or not a failure is occurring in the FPGA 40 is decided (a step S5), and, in case in which the failure is not occurring in the FPGA 40, whether or not a failure is occurring in the FPGA 41 is decided (a step S6).

In case in which a failure is occurring in neither of the FPGAs 40 and 41, whether or not periodic switching timing for the purpose of making one of the FPGAs 40 and 41 the active system and making the other the stand-by system comes is decided (a step S7). In case in which this periodic switching timing is not generated, the processing of the step S5 through the step S7 is repeated until the switching timing comes.

If the switching timing comes, whether or not a failure is occurring in both of the systems of the FPGAs 40 and 41 is decided (a step S8). Also in case in which a failure is occurring in either one of the FPGAs 40 and 41, the processing of the step S8 is executed. Then, in case in which the failure is occurring in both of the systems, processing is returned to the step S1, and the processing described before is executed again.

In case in which a failure is occurring in neither of the FPGAs 40 and 41, whether at present the FPGA 40 is under operation or the FPGA 41 is under operation is decided (a step S9). By this decision processing, in case in which at present the FPGA 40 is in the active system, the FPGA 41 is switched to the active system (a step S10). At this time, the FPGA 40 which is in the active system is switched to the stand-by system. To the FPGA 40 shifted to the stand-by system, the configuration processing is executed (a step S11). After that, the processing is returned to the step S5. In this case, also in case in which a failure occurs in the FPGA 40 (the step S5) and it is shifted to the stand-by system, the configuration processing is executed to the FPGA 40, similarly. Further, as a result of this decision processing (the step S9), in case in which at present the FPGA 41 is in the active system, the FPGA 40 is switched to the active system (a step S12). At this time, the FPGA 41 which is in the active system is switched to the stand-by system. To the FPGA 41 shifted to the stand-by system, the configuration processing is executed (a step S13). After that, the processing is returned to the step S5. In this case, also in case in which a failure occurs in the FPGA 41 (the step S6) and it is shifted to the stand-by system, it goes without saying that the configuration processing is executed to the FPGA 41 similarly.

Figure 3:
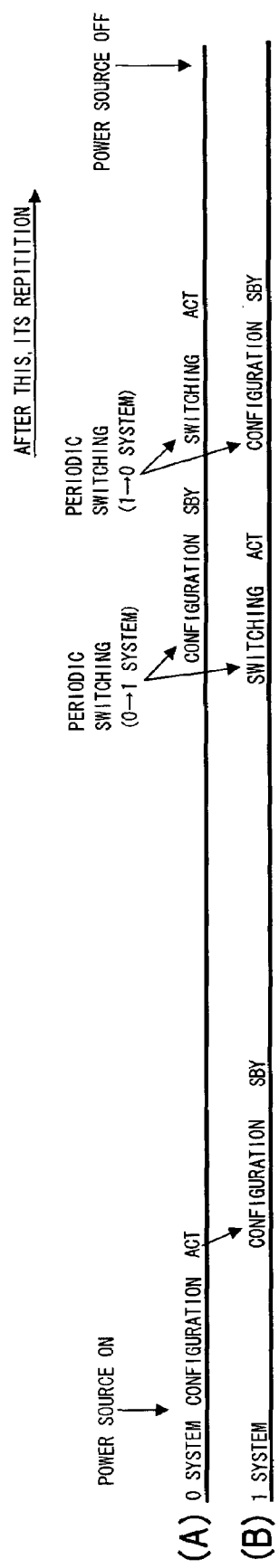
FIG. 3 is a drawing showing basic operation in case in which a failure is not occurring in the functional device.

Next, in connection with the function maintaining method or the function maintaining program, its fundamental operation is explained by referring to FIG. 3. FIG. 3 shows basic operation in case in which a failure is not occurring. In FIG. 3, a reference letter (A) shows operation of the FPGA 40 side, and a reference letter (B) shows operation of the FPGA 41 side.

If a power source is impressed, the FPGA 40 comes into the active system (ACT) after the configuration processing to the FPGA 40. With this shift to the active system of the FPGA 40, the configuration processing of the FPGA 41 is executed, and the FPGA 41 comes into the stand-by system (SBY).

If operation like this is performed continuously and a predetermined time passes, the periodic switching is executed. As a result of this, the FPGA 41 under stand-by comes into the active system (ACT). The FPGA 40 which is in the active system is shifted to the stand-by system (SBY), and its stand-by state is maintained after the configuration processing. Further, if the predetermined time passes from this state, the periodic switching is executed. By this, the FPGA 40 under stand-by comes into the active system, and the FPGA 41 which is in the active system is shifted to the stand-by system. After that, the configuration processing is given, and its stand-by state is maintained. Such operation is executed until the power source is released.

Figure 4:
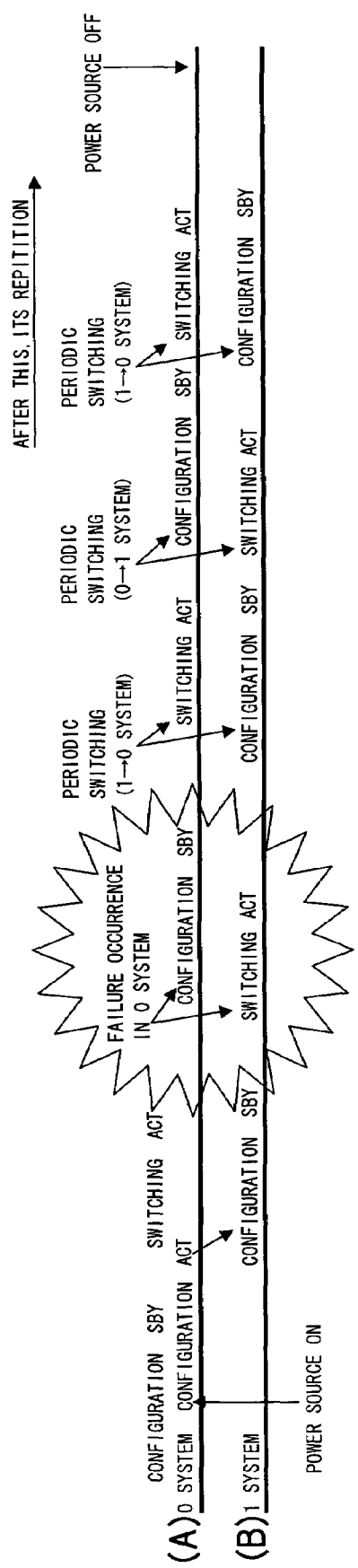
FIG. 4 is a drawing showing a switch and a configuration due to occurrence of a failure of a 0 (zero) system before periodic switching.
Figure 5:
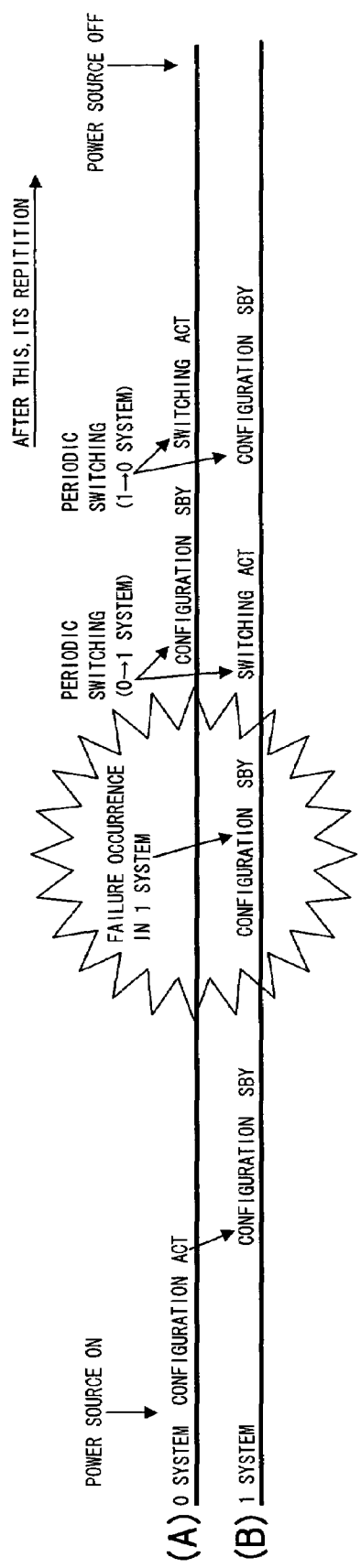
FIG. 5 is a drawing showing a switch and a configuration due to occurrence of a failure of a 1 (one) system before the periodic switching.

Next, in connection with the function maintaining method or the function maintaining program, operation corresponding to failure occurrence before the periodic switching is explained by referring to FIG. 4 and FIG. 5. FIG. 4 shows operation in case in which a failure occurs in the 0 system before the periodic switching. In FIG. 4, a reference letter (A) shows operation of the FPGA 40 side, and a reference letter (B) shows operation of the FPGA 41 side. Further, FIG. 5 shows operation in case in which a failure occurs in the 1 system before the periodic switching. In FIG. 5, a reference letter (A) shows operation of the FPGA 40 side, and a reference letter (B) shows operation of the FPGA 41 side.

As shown in FIG. 4, the operation after the impression of the power source is as described before. In this case, if a failure occurs in the FPGA 40 under operation before the periodic switching, the FPGA 41 under stand-by is switched to the active system (ACT). The FPGA 40 which is in the failure is shifted to the stand-by system (SBY) After that, the configuration processing is given, and its stand-by state is maintained. Further, if the predetermined time passes from this state, the periodic switching is executed, the FPGA 40 under stand-by is switched to the active system (ACT), and the FPGA 41 which is in the active system comes into the stand-by system (SBY) after the configuration processing. Such operation is executed until the power source is released.

Further, as shown in FIG. 5, the operation after the impression of the power source is as described before. If a failure occurs in the FPGA 41 under stand-by before the periodic switching, the configuration processing is executed again to the FPGA 41 which is in the failure. After this processing, its stand-by state is maintained. Further, if the predetermined time passes from this state, the periodic switching is executed, the FPGA 41 under stand-by comes into the active system, and the FPGA 40 which is the active system comes into the stand-by system after the configuration processing. Similarly, such operation is executed until the power source is released.

Figure 6:
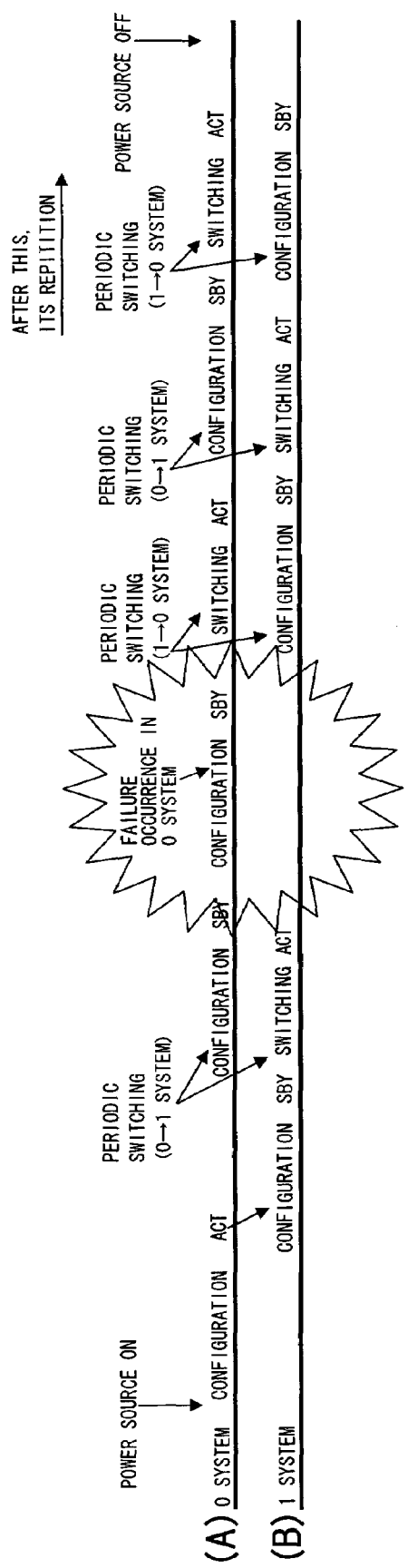
FIG. 6 is a drawing showing a switch and a configuration due to occurrence of a failure of the 0 system after periodic switching (0→1 system)
Figure 7:
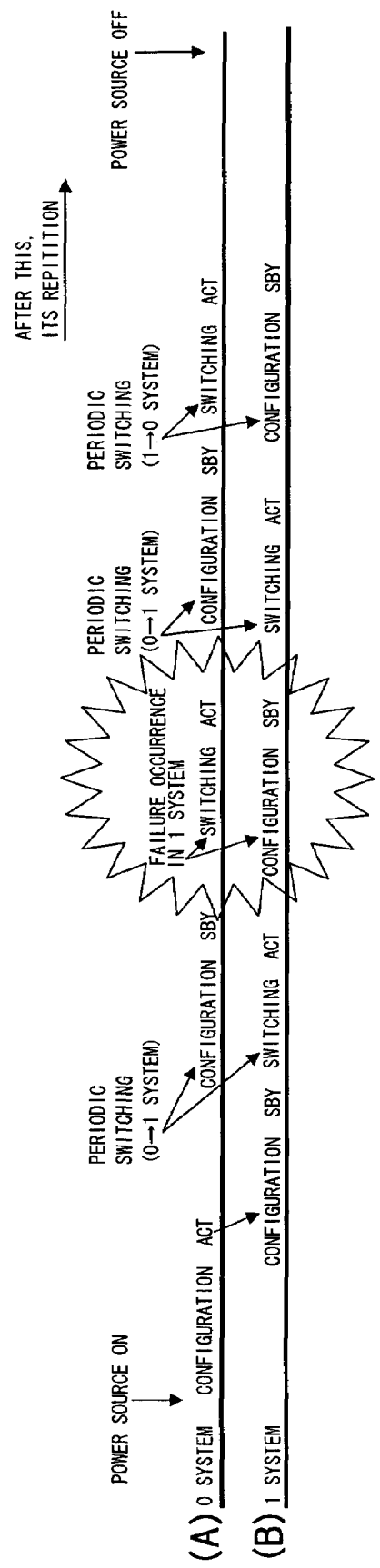
FIG. 7 is a drawing showing a switch and a configuration due to occurrence of a failure of the 1 system after the periodic switching (0→1 system)

Next, in connection with the function maintaining method or the function maintaining program, operation corresponding to failure occurrence after the periodic switching from the 0 system to the 1 system is explained by referring to FIG. 6 and FIG. 7. FIG. 6 shows a case in which a failure occurs in the 0 system under stand-by after the periodic switching from the 0 system to the 1 system. In FIG. 6, a reference letter (A) shows operation of the FPGA 40 side, and a reference letter (B) shows operation of the FPGA 41 side. Further, FIG. 7 shows a case in which a failure occurs in the 1 system under operation after the periodic switching from the 0 system to the 1 system. In FIG. 7, a reference letter (A) shows operation of the FPGA 40 side, and a reference letter (B) shows operation of the FPGA 41 side.

As shown in FIG. 6, the operation after the impression of the power source is as described before. If a failure occurs in the FPGA 40 under stand-by after the periodic switching from the 0 system to the 1 system, the configuration processing is given again to the FPGA 40 which is in the failure, and, after this processing, its stand-by state is maintained. Further, if the predetermined time passes from this state, the periodic switching is executed, the FPGA 40 under stand-by comes into the active system, and the FPGA 41 which is the active system comes into the stand-by system after the configuration processing. Similarly, such operation is executed until the power source is released.

As shown in FIG. 7, the operation after the impression of the power source is as described before. If a failure occurs in the FPGA 41 under operation after the periodic switching from the 0 system to the 1 system, the FPGA 40 which is under stand-by is made to return to the active system. The FPGA 41 which is in the failure is shifted to the stand-by system, and, after that, the configuration processing is given to the FPGA 41 and its stand-by state is maintained. Further, if the predetermined time passes from this state, the periodic switching is executed, the FPGA 41 under stand-by comes into the active system, and the FPGA 40 which is the active system comes into the stand-by system after the configuration processing. Similarly, such operation is executed until the power source is released.

Figure 8:
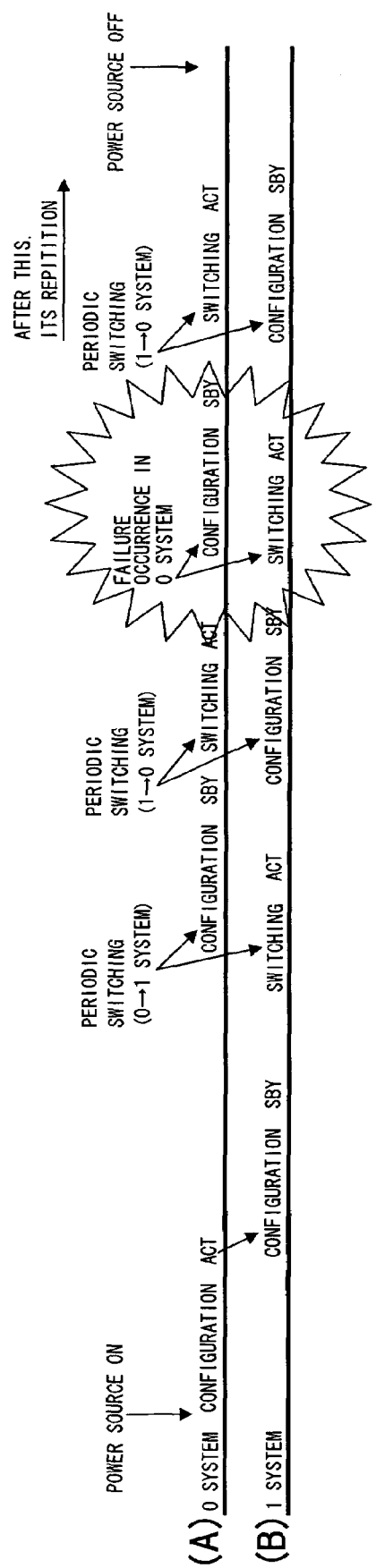
FIG. 8 is a drawing showing a switch and a configuration due to occurrence of a failure of the 0 system after the periodic switching (0→1 system) and the periodic switching (1→0 system)
Figure 9:
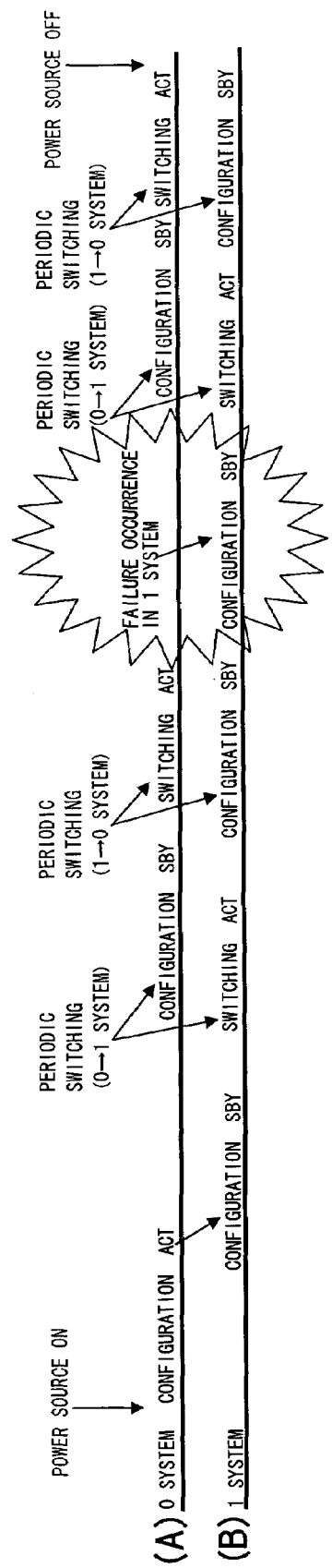
FIG. 9 is a drawing showing a switch and a configuration due to occurrence of a failure of the 1 system after the periodic switching (0→1 system) and the periodic switching (1→0 system)

Next, in connection with the function maintaining method or the function maintaining program, operation corresponding to failure occurrence after the periodic switching from the 1 system to the 0 system is explained by referring to FIG. 8 and FIG. 9. FIG. 8 shows a case in which a failure occurs in the 0 system after the periodic switching from the 1 system to the 0 system. In FIG. 8, a reference letter (A) shows operation of the FPGA 40 side, and a reference letter (B) shows operation of the FPGA 41 side. Further, FIG. 9 shows a case in which a failure occurs in the 1 system after the periodic switching from the 1 system to the 0 system. In FIG. 9, a reference letter (A) shows operation of the FPGA 40 side, and a reference letter (B) shows operation of the FPGA 41 side.

As shown in FIG. 8, the operation after the impression of the power source is as described before. If a failure occurs in the FPGA 40 under operation after the periodic switching from the 1 system to the 0 system, the FPGA 41 which is under stand-by is made to return to the active system. The FPGA 40 which is in the failure is shifted to the stand-by system, and, after that, the configuration processing is given and its stand-by state is maintained. Further, if the predetermined time passes from this state, the periodic switching is executed, the FPGA 40 under stand-by comes into the active system, and the FPGA 41 which is the active system comes into the stand-by system after the configuration processing. Operation like this is executed until the power source is released.

As shown in FIG. 9, the operation after the impression of the power source is as described before. If a failure occurs in the FPGA 41 under stand-by after the periodic switching from the 1 system to the 0 system, the configuration processing is given again to the FPGA 41 which is in the failure, and, after this processing, its stand-by state is maintained. Further, if the predetermined time passes from this state, the periodic switching is executed, the FPGA 41 under stand-by comes into the active system, and the FPGA 40 which is the active system comes into the stand-by system after the configuration processing. Similarly, operation like this is executed until the power source is released.

Figure 10:
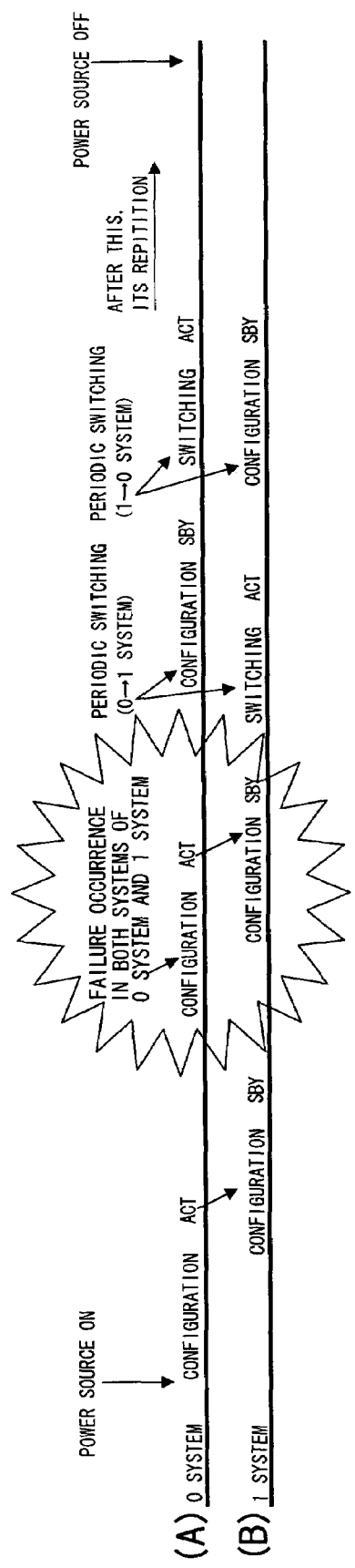
FIG. 10 is a drawing showing a switch and a configuration at the time of occurrence of failures of both the systems.

Next, in connection with the function maintaining method or the function maintaining program, operation corresponding to failure occurrence in both systems of the 0 system and the 1 system is explained by referring to FIG. 10. FIG. 10 shows a case in which a failure occurs in both systems of the 0 system and the 1 system to the 0 system. In FIG. 10, a reference letter (A) shows operation of the FPGA 40 side, and a reference letter (B) shows operation of the FPGA 41 side.

The basic operation after the impression of the power source is as described before. In this case, for example, on the supposition that the FPGA 40 is the active system and the FPGA 41 is the stand-by system, if a failure occurs in both of the 0 system and the 1 system, the operation of the FPGA 40 which is under operation is stopped, and, after the configuration processing, this FPGA 40 is set to the active system. After this, the configuration processing is given to the FPGA 41 which is under stand-by, and its stand-by state is maintained again. Further, if the predetermined time passes from this state, the periodic switching is executed, the FPGA 41 under stand-by comes into the active system, and the FPGA 40 which is the active system comes into the stand-by system after the configuration processing. Similarly, such operation is executed until the power source is released.

Figure 11:
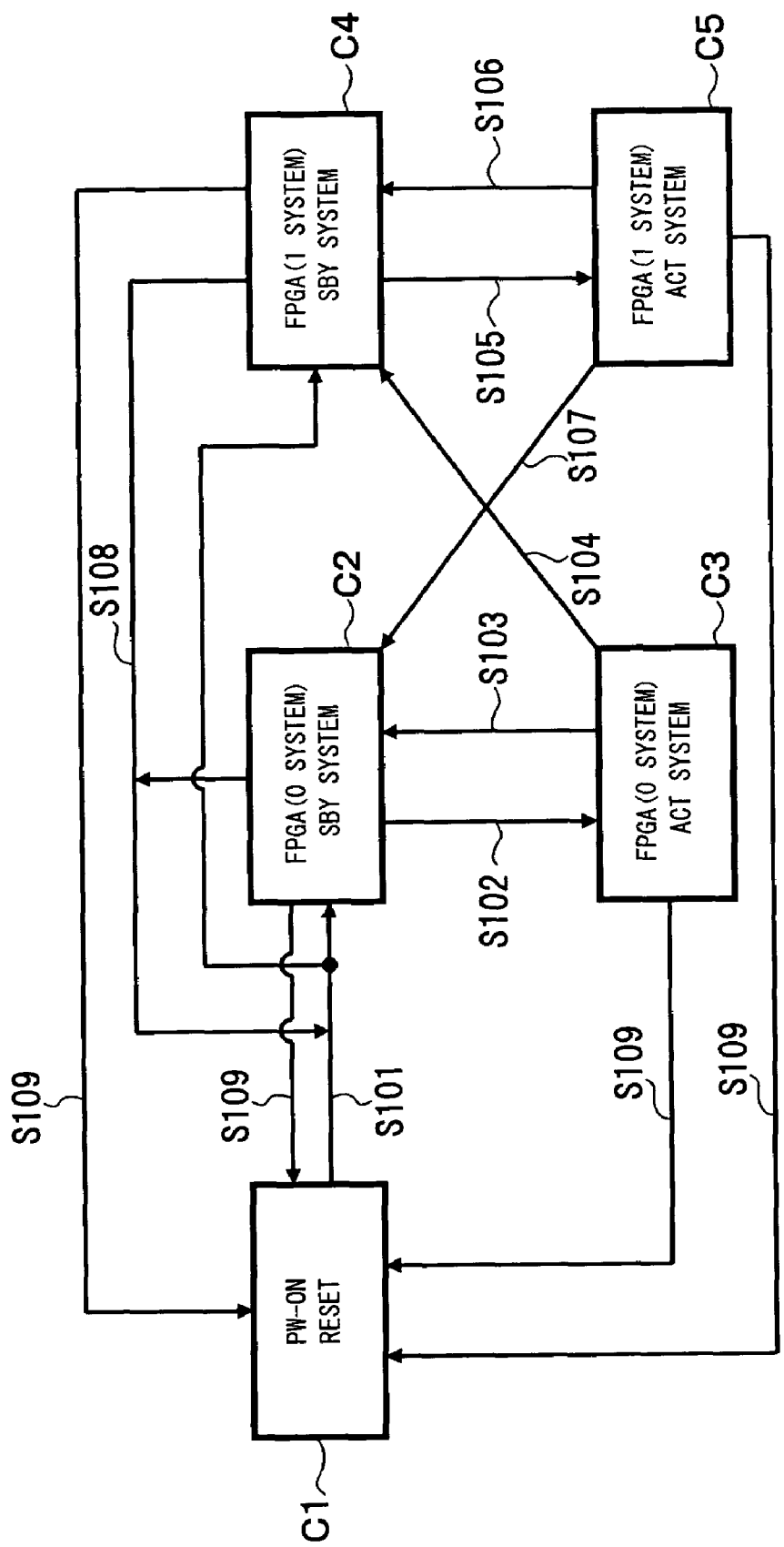
FIG. 11 is a drawing showing operating sequence of the functional device.

Operating sequence like this is explained by referring to FIG. 11. FIG. 11 shows the operating sequence of the functional device.

This sequence includes each state of a state C1 of power-impression (PW-ON) and reset, a stand-by state C2 of the FPGA 40, an operating state C3 of the FPGA 40, a stand-by state C4 of the FPGA 41 and an operating state C5 of the FPGA 41.

Now, if the power source is impressed (PW-ON), the configuration of the FPGA 41 is practiced after practice of the configuration of the FPGA 40, and the FPGA 40 shifts from this power-impression to the stand-by state C2 (a step S101). In the stand-by state C2 of the FPGA 40, the configuration processing of the FPGA 40 is executed. Further, the FPGA 40 shifts from the stand-by state C2 to the operating state C3 (a step S102). In this operating state C3, the processing after the power-impression, the processing of the time of the periodic switching, the processing of the time of a failure in the FPGA 41 and the processing of the time of failures in both the systems are executed. In case in which the FPGA 40 shifts from the operating state C3 to the stand-by state C2 (a step S103), the configuration processing of the time of the recovery of a failure is executed.

Further, a shift from the operating state C3 of the FPGA 40 to the stand-by state C4 of the FPGA 41 (a step S104) is a case of the failure occurrence in the FPGA 40 or a case of the periodic switching. In the stand-by state C4 of the FPGA 41, the configuration processing of the FPGA 41 is executed. Further, the FPGA 41 shifts from the stand-by state C4 to the operating state C5 (a step S105). In this operating state C5, the processing after the power-impression, the processing of the time of the periodic switching, the processing of the time of a failure in the FPGA 40 and the processing of the time of failures in both the systems are executed. In case in which the FPGA 41 shifts from the operating state C5 to the stand-by state C4 (a step S106), the configuration processing of the time of the recovery of a failure is executed. A shift from the operating state C5 of the FPGA 41 to the stand-by state C2 of the FPGA 40 (a step S107) is a case of the failure occurrence in the FPGA 40 or a case of the periodic switching.

Furthermore, in case in which a failure occurs in both of the systems, the configuration of the FPGA 41 is practiced after practice of the configuration of the FPGA 40 (a step S108). Then, all of the operation is stopped by a release of the power source (PW-OFF), and the sequence is returned to the state C1 (a step S109).

Second Embodiment

Figure 12:
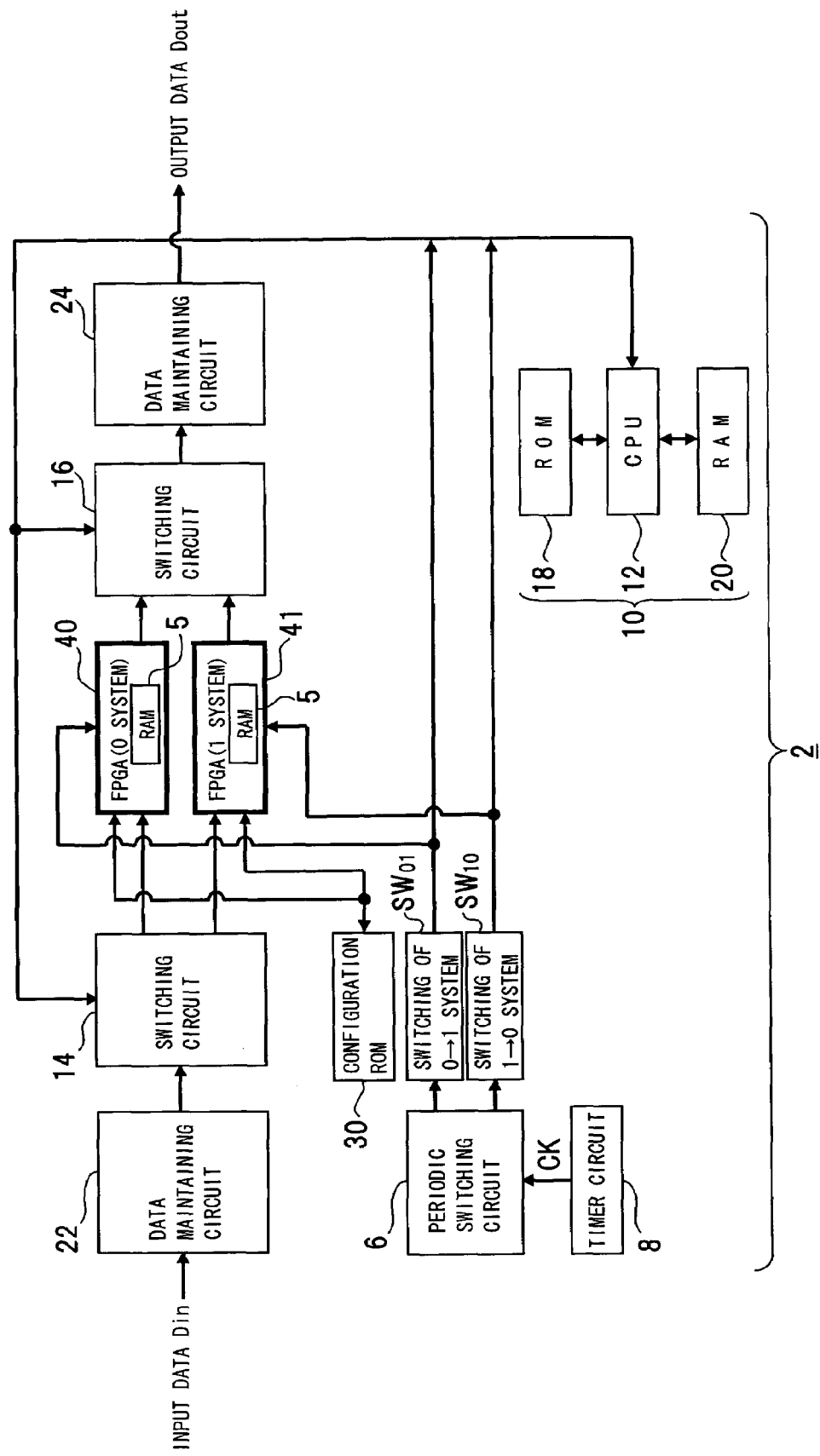
FIG. 12 is a block diagram showing a functional device according to a second embodiment of the present invention.
Figure 13:
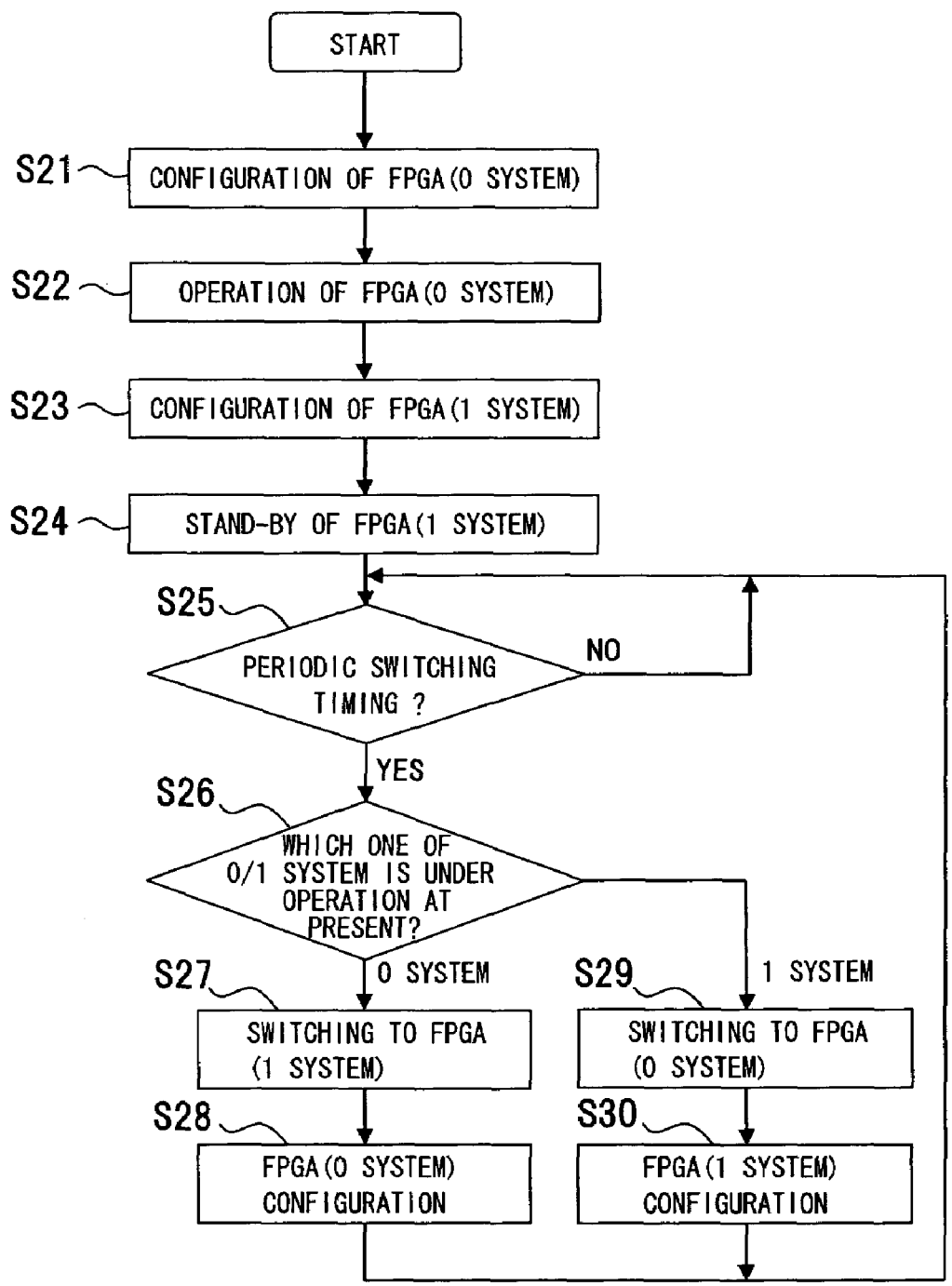
FIG. 13 is a flow diagram showing operation of the functional device, a function maintaining method and a function maintaining program according to the second embodiment of the present invention.

A second embodiment of the present invention is explained by referring to FIG. 12 and FIG. 13. FIG. 12 shows a functional device according to the second embodiment, and FIG. 13 shows a function maintaining method and a function maintaining program according to the second embodiment.

A functional device 2 according to this embodiment is constituted with the exception of the switching due to failure occurrence from the functional device 2 (FIG. 1) according to the first embodiment. That is, this embodiment is constituted to alternately periodically switch one of the FPGAs 40 and 41 to the active system and the other to the stand-by system, and is constituted to give the configuration processing to the FPGA 40 or the FPGA 41 under stand-by. The same portions as those of the functional device 2 (FIG. 1) according to the first embodiment are indicated by the same reference numerals, and these explanations are omitted.

Therefore, in this functional device 2, the periodic switching of the function of the FPGAs 40 and 41 and the periodic configuration processing of the FPGAs 40 and 41 are executed as shown in FIG. 13.

As described before, by impressing a power source, all systems of the functional device 2 are shifted to an operating state. Then, after configuration processing of the FPGA 40 is executed as initialization processing (a step S21), the FPGA 40 which is initialized comes into the active system (a step S22). Receiving this shift to the active system, the configuration processing of the FPGA 41 is executed (a step S23), and, after that, the FPGA 41 comes into the stand-by system (a step S24). The configuration processing of these FPGAs 40 and 41 is performed by writing circuit information, which is given to FPGAs 40 and 41 from the ROM 30, in the RAM 5.

After the above-mentioned configuration processing, as operation processing of the FPGAs 40 and 41, either one of the FPGAs 40 and 41 is set to the active system and the other is set to the stand-by system by the switching signal $SW_{01}$ or $SW_{10}$ of the periodic switching circuit 6. As a result of this, the input data $D_{in}$ is given to the FPGA 40 or 41 under operation, and the output data $D_{out}$ is taken out from the FPGA 40 or 41 under operation.

If the operation of a necessary function is continued by the FPGA 40 being maintained in the active system and the FPGA 41 being maintained in the stand-by system as mentioned above, a decision in regard to the coming of periodic switching timing is executed (a step S25). Then, if the switching timing comes, whether at present the FPGA 40 is under operation or the FPGA 41 is under operation is decided (a step S26). By this decision processing, in case in which at present the FPGA 40 is in the active system, the FPGA 41 is switched to the active system (a step S27). At this time, the FPGA 40 which is in the active system is switched to the stand-by system. To the FPGA 40 shifted to the stand-by system, the configuration processing is executed (a step S28). After that, the processing is returned to the step S25.

Furthermore, by the decision processing (the step S26), in case in which at present the FPGA 41 is in the active system, the FPGA 40 is switched to the active system (a step S29). To the FPGA 41 which is switched to the stand-by system, the configuration processing is executed (a step S30). After that, the processing is returned to the step S25.

If the FPGA 40 comes into the active system as mentioned above, the FPGA 41 comes into the stand-by system, and the configuration processing is executed. Further, at next timing, the FPGA 40 which is in the active system is switched to the stand-by system and the configuration processing is executed, and the FPGA 41 which is in the stand-by system comes into the active system. Since the operational switching is continuously performed every predetermined time as mentioned above, the FPGAs 40 and 41 of which the functions a reguaranteed by the configuration processing are continuously switched, and the reliability of the function is heightened.

Third Embodiment

Figure 14:
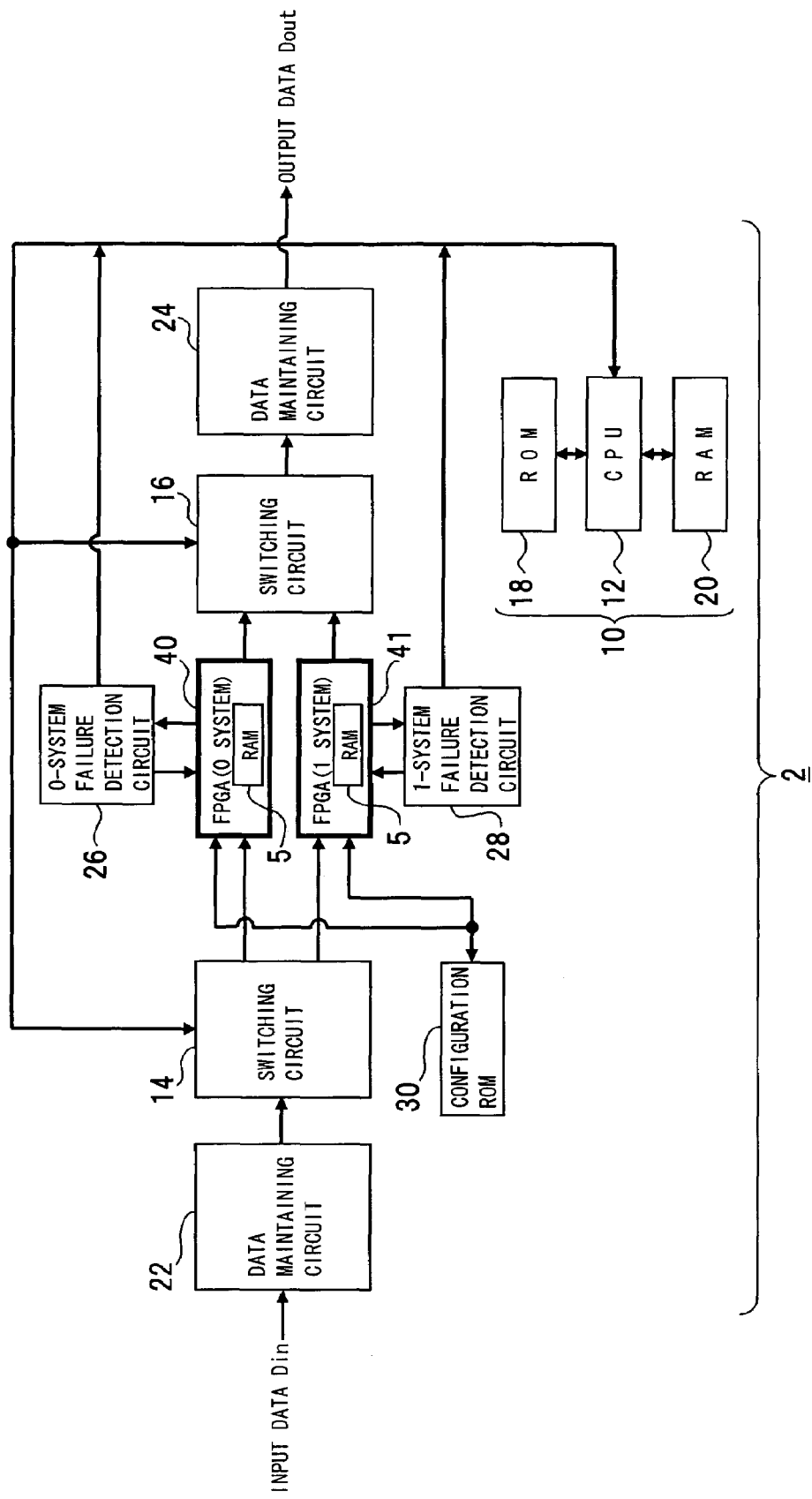
FIG. 14 is a block diagram showing a functional device according to a third embodiment of the present invention.
Figure 15:
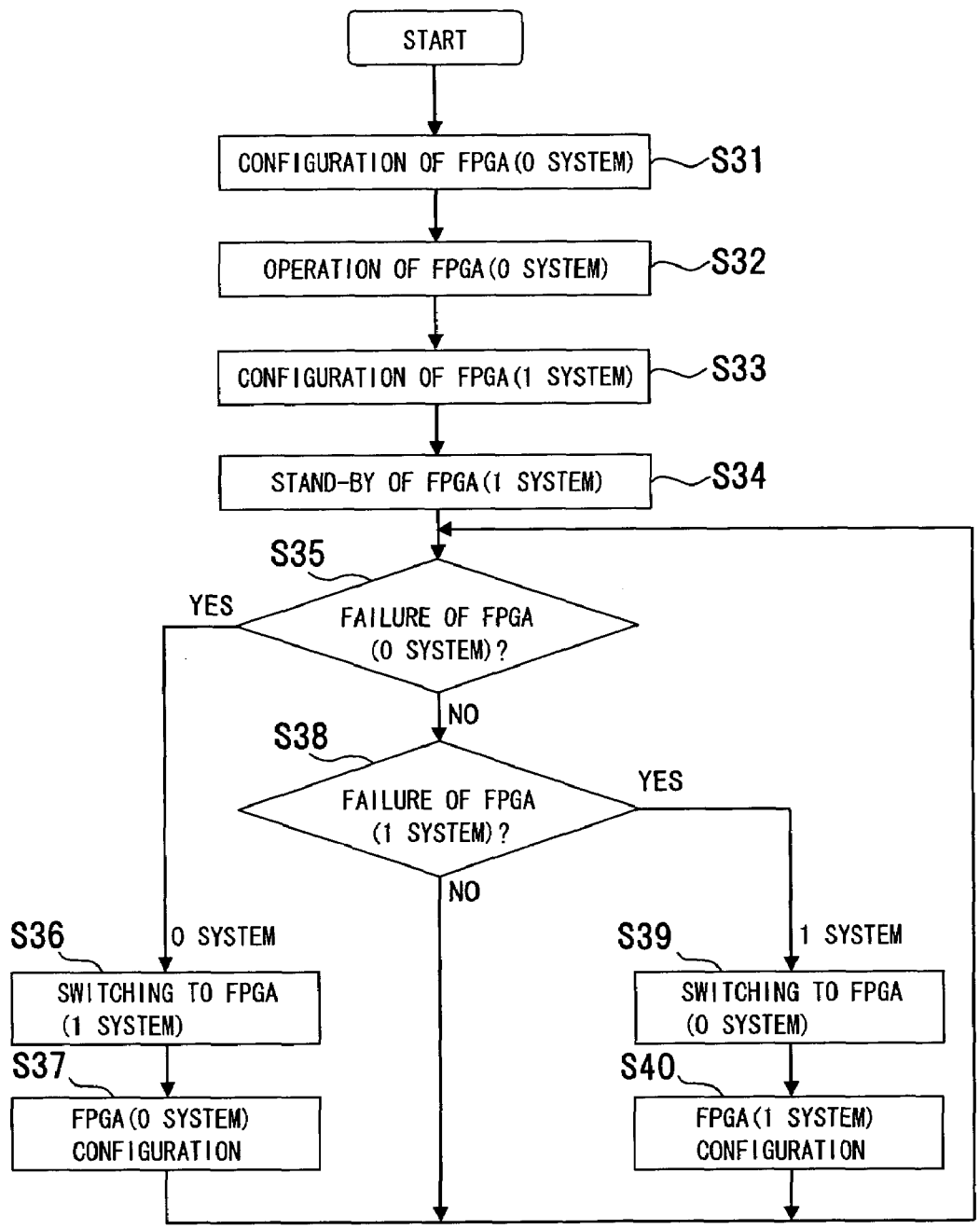
FIG. 15 is a flow diagram showing operation of the functional device, a function maintaining method and a function maintaining program according to the third embodiment of the present invention.

A third embodiment of the present invention is explained by referring to FIG. 14 and FIG. 15. FIG. 14 shows a functional device according to the third embodiment, and FIG. 15 shows a function maintaining method and a function maintaining program according to the third embodiment.

A functional device 2 according to this embodiment is constituted with the exception of a constitution of the periodic switching from the functional device 2 (FIG. 1) according to the first embodiment, and is constituted to have only the switching of the time of a failure. That is, this functional device 2 is constituted so that the FPGA 40 or the FPGA 41 under stand-by is switched to the active system if a failure occurs in case in which the FPGA 40 or the FPGA 41 is in the active system, and so that the configuration processing is given to the FPGA 40 or the FPGA 41 under stand-by. The same portions as those of the functional device 2 (FIG. 1) according to the first embodiment are indicated by the same reference numerals, and these explanations are omitted.

Therefore, in this functional device 2, at the time of failure occurrence, the operational switching of the FPGAs 40 and 41 is performed, and the configuration processing is also executed, as shown in FIG. 15.

As described before, by impressing a power source, all systems of the functional device 2 are shifted to an operating state. Then, after the configuration processing of the FPGA 40 is executed as initialization processing (a step S31), the FPGA 40 which is initialized comes into the active system (a step S32). Receiving this shift to the active system, the configuration processing of the FPGA 41 is executed (a step S33), and, after that, the FPGA 41 comes into the stand-by system (a step S34). The configuration processing of these FPGAs 40 and 41 is performed by writing circuit information, which is given to the FPGAs 40 and 41 from the ROM 30, in the RAM 5.

After the above-mentioned configuration processing, as operation processing of the FPGAs 40 and 41, either one of the FPGAs 40 and 41 is set to the active system and the other is set to the stand-by system. As a result of this, the input data $D_{in}$ is given to the FPGA 40 or 41 under operation, and the output data $D_{out}$ is taken out from the FPGA 40 or 41 under operation.

Regarding these FPGAs 40 and 41 which are in the active system or the stand-by system, whether or not a failure is occurring is decided by the outputs of the 0-system failure detection circuit 26 and the 1-system failure detection circuit 28. In this embodiment, first, whether or not a failure is occurring in the FPGA 40 is decided (a step S35). In case in which the failure is occurring in the FPGA 40, the FPGA 41 is switched to the active system (a step S36). Then, the configuration processing is executed to the FPGA 40 shifted to the stand-by system (a step S37), and the processing is returned to the step S35.

On the other hand, in case in which a failure is not occurring in the FPGA 40, whether or not a failure is occurring in the FPGA 41 is decided (a step S38). In case in which the failure is occurring in the FPGA 41, the FPGA 40 is switched to the active system (a step S39). Then, the configuration processing is executed to the FPGA 41 shifted to the stand-by system (a step S40), and the processing is returned to the step S35.

Like this, if a failure occurs in the FPGA 40 which is in the active system, the FPGA 41 comes into the active system, and the configuration processing is also executed to the FPGA 40 shifted to the stand-by system. On the other hand, if a failure occurs in the FPGA 41 which is in the active system, the FPGA 40 comes into the active system, and the configuration processing is also executed to the FPGA 41 shifted to the stand-by system. Like this, if a failure occurs, the stand-by system comes into the active system, and, along with the shift to the stand-by system, the configuration processing is performed. By this, since the function is guaranteed, the reliability of the function is heightened.

Fourth Embodiment

Figure 16:
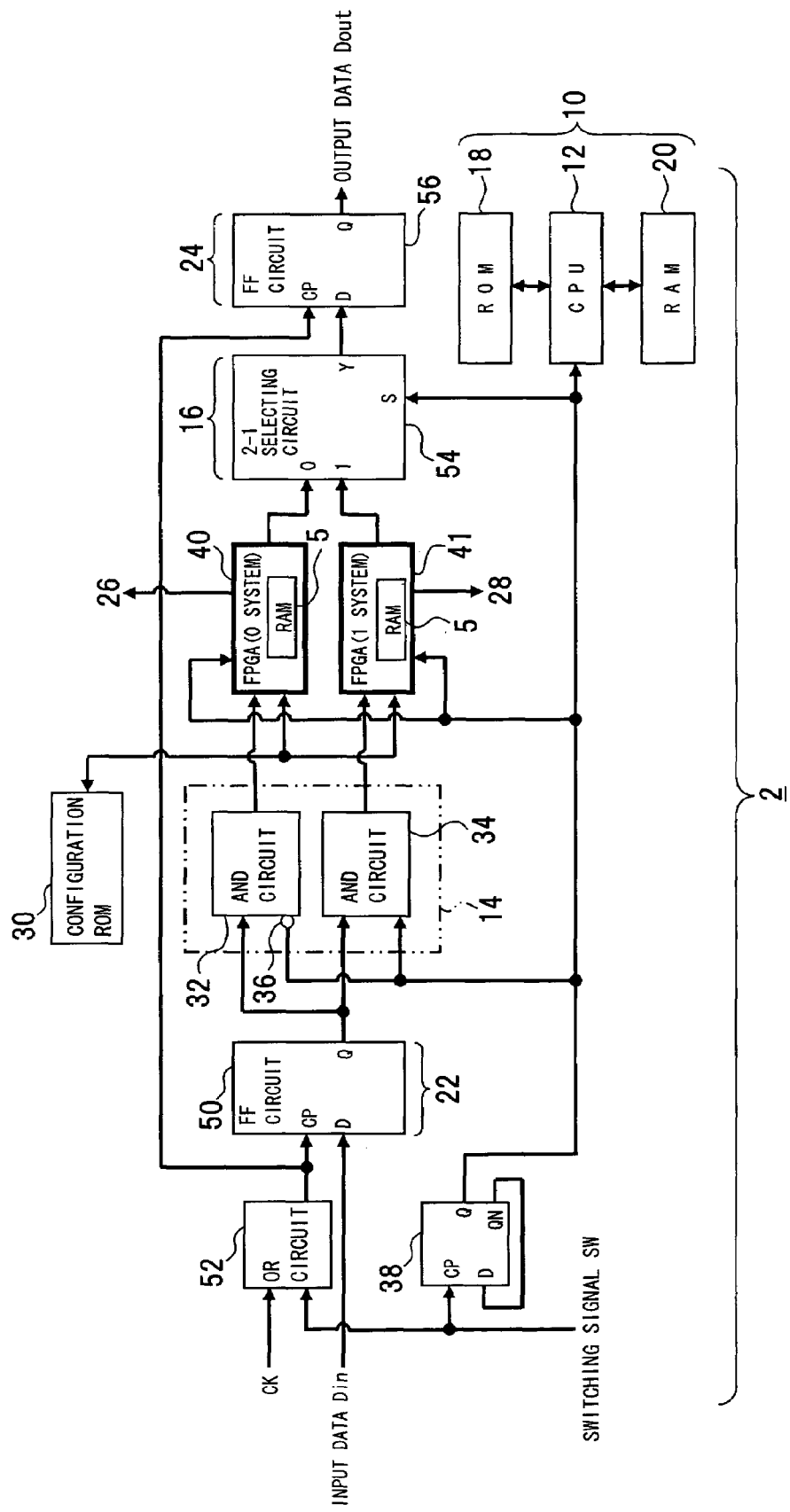
FIG. 16 is a block diagram showing a functional device according to a fourth embodiment of the present invention.

Next, the specific example of a constitution of the functional device according to the first embodiment is explained by referring to FIG. 16. FIG. 16 shows a functional device according to a fourth embodiment of the present invention. This fourth embodiment materializes the maintenance of an input-output data and the switching circuits in the first embodiment. The same portions as those of the functional device according to the first embodiment are indicated by the same reference numerals.

In a functional device 2 of this embodiment, as the switching circuit 14 of the input data $D_{in}$ to the FPGAs 40 and 41, an AND circuits 32 and 34 are provided. The AND circuit 32 corresponds to the FPGA 40, and the AND circuit 34 corresponds to the FPGA 41. In order to selectively control the AND circuit 32 and the AND circuit 34 to a signal passing state, a NOT circuit 36 is added to one input of the AND circuit 32. Further, the input data $D_{in}$ is given to each of the AND circuits 32 and 34 from the data maintaining circuit 22 in common, and an output Q of a flip-flop (FF) circuit 38 is also given to them. To the FF circuit 38, the switching signal SW is given as a clock input CP from the periodic switching circuit 6 (FIG. 1) described before. By this switching signal SW, the output Q is obtained. An output QN is given to a data input D. Therefore, the AND circuits 32 and 34 of the switching circuit 14 are switched to the signal passing state synchronously with the switching signal SW. The input data $D_{in}$ from the data maintaining circuit 22 is given to the FPGA 40 through the AND circuit 32 which is in the signal passing state, and is given to the FPGA 41 through the AND circuit 34 which is in the signal passing state. In this case, the Q output of the FF circuit 38 is used for a reset input of the FPGAs 40 and 41, and the FPGAs 40 and 41 receive this reset input and shift to the stand-by state.

For the data maintaining circuit 22, a flip-flop (FF) circuit 50 is used. To this FF circuit 50, the input data $D_{in}$ is given to its data input D, and an output of an OR circuit 52 is given to its clock input CP. The clock signal CK and the switching signal SW from the periodic switching circuit 6 described before are given to the OR circuit 52, and an output added time-sequentially is obtained as its output. In this case, for the clock signal CK, for example, a continuous pulse signal of 100 MHz is used. Accordingly, the input data $D_{in}$ is maintained in the FF circuit 50, and its maintained output is given to the AND circuits 32 and 34 from its output Q.

Further, for the switching circuit 16, a 2-1 selecting circuit 54 which selects one input from two inputs and outputs it is used. The output data $D_{out}$ of the FPGA 40 is given to a 0 (zero) input side of the two inputs, and the output data $D_{out}$ of the FPGA 41 is given to its 1 (one) input side. To a switching input S of this selecting circuit 54, the output Q of the FF circuit 38 corresponding to the switching signal SW is given. Therefore, selecting operation of the AND circuits 32 and 34 of the switching circuit 14 and the selecting circuit 54 of the switching circuit 16 is performed synchronously with the switching signal SW. Because of this, in case in which the input data $D_{in}$ is applied to the FPGA 40 through the AND circuit 32, the output data $D_{out}$ of the FPGA 40 is taken out from an output Y of the selecting circuit 54. On the other hand, in case in which the input data $D_{in}$ is applied to the FPGA 41 through the AND circuit 34, the output data $D_{out}$ of the FPGA 41 is taken out from the output Y of the selecting circuit 54.

Further, for the data maintaining circuit 24, a flip-flop (FF) circuit 56 is used. To this FF circuit 56, the output data $D_{out}$ is given to its data input D from the selecting circuit 54, and the output of the OR circuit 52 described before is given to its clock input CP. Accordingly, the output data $D_{out}$ which is obtained from the selecting circuit 54 is maintained in the FF circuit 56, and its maintained output is taken out from its output Q.

Furthermore, the 0-system failure detection circuit 26 (FIG. 1) described before is connected to the FPGA 40, and the 1-system failure detection circuit (FIG. 1) described before is connected to the FPGA 41, respectively. By this, a failure which occurs in the FPGAs 40 and 41 is individually detected. By this detection of a failure, the switching signal SW generated by the 0-system failure detection circuit 26 and the 1-system failure detection circuit 28 is given as the inputs of the FF circuit 38 and the OR circuit 52. Therefore, the switching operation of the AND circuits 32 and 34 and the selecting circuit 54 is similarly performed also based on the detection of a failure in addition to the periodic switching, and, when shifting from the active system to the stand-by system, the Q output of the FF circuit 38 is given as a reset input and the FPGAs 40 and 41 are reset.

Figure 17:
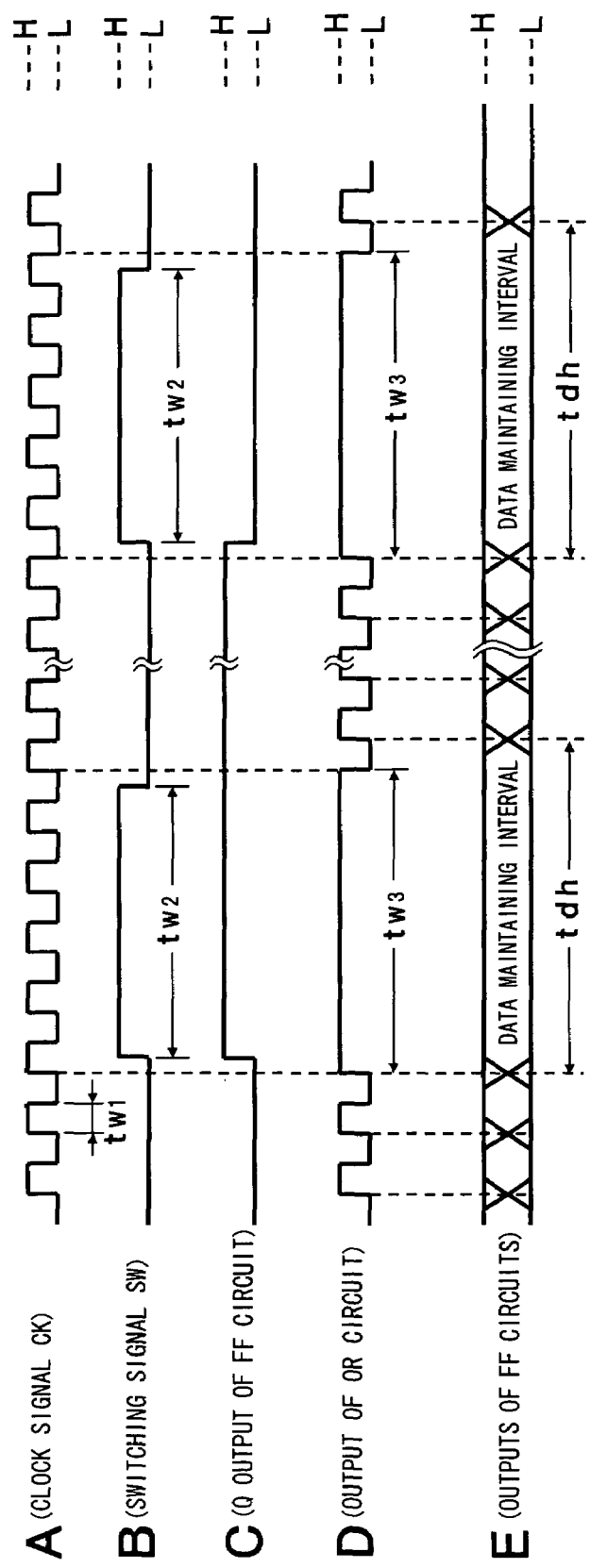
FIG. 17 is a timing chart showing operation of the functional device shown in FIG. 16.

Such maintenance of an input-output data is explained by referring to FIG. 17. FIG. 17 shows a timing chart of the maintenance of an input-output data. In FIG. 17, a reference letter "A" is an example of the clock signal, a reference letter "B" is an example of the switching signal, a reference letter "C" is an example of the output of the FF circuit, a reference letter "D" is an example of the output of the OR circuit, and a reference letter "E" is an example of the outputs of the other FF circuits.

A signal width $tw_2$ of the switching signal SW is set large as opposed to a signal width $tw_1$ of the clock signal CK (FIG. 17A, FIG. 17B). This is for the purpose of making into a signal width able to penetrate the switching signal SW by the clock signal CK. If the switching signal SW is applied to the clock input CP of the FF circuit 38, a frequency-divided output of the switching signal SW is obtained from the Q output of the FF circuit 38 as shown in FIG. 17C. Further, if the clock signal CK and the switching signal SW are applied to the OR circuit 52, both of the inputs are to be added time-sequentially, and an output of a signal width $tw_3$ larger than the signal width $tw_2$ of the switching signal SW is obtained from the output of the OR circuit 52 as shown in FIG. 17D.

If this output of the OR circuit 52 is applied to the FF circuits 50 and 56, since the data maintaining operation of each of the FF circuits 50 and 56 synchronizes with rising of the clock input CP, the input data $D_{in}$ is maintained in the FF circuit 50 at a data maintaining interval tdh and the output data $D_{out}$ is maintained in the FF circuit 56 at the data maintaining interval tdh as shown in FIG. 17E.

The functional device 2 according to the first through third embodiments can be constituted by the circuit shown in FIG. 16, and it is possible to perform the periodic switching of the FPGAs 40 and 41, to perform the switching of the time of failure occurrence in the FPGA 40 or 41, or to perform the switching of both of these. By this, since it is possible to realize a continuous function without stopping a system, it is possible to strengthen and improve the reliability of the system.

Next, in connection with the embodiments mentioned above, modified examples are enumerated in the following.

Figure 18:
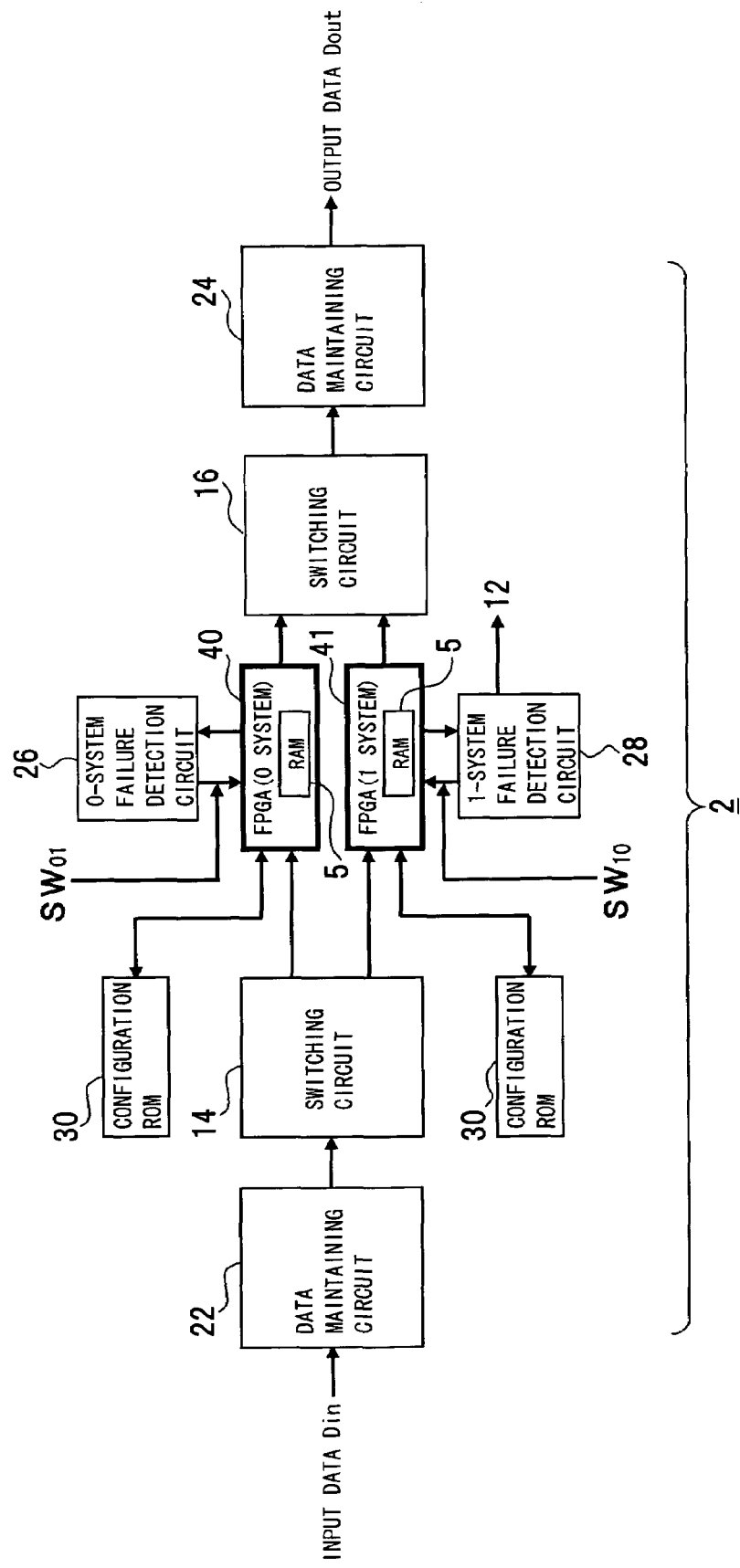
FIG. 18 is a block diagram showing another embodiment of a functional device.

(1) In the above-mentioned embodiments, the single ROM 30 which stores the circuit information is provided for the FPGAs 40 and 41 in common. However, as shown in FIG. 18, the ROM 30 may also be provided for each of the FPGAs 40 and 41 individually.

(2) In the above-mentioned embodiments, the FPGAs 40 and 41 are provided as the plurality of function parts, and one is made into the active system and the other is made into the stand-by system. However, FPGAs more than two can be provided as the plurality of function parts, and a plurality of stand-by systems may also be provided as opposed to one active system.

(3) Although in the above-mentioned embodiments the control part 10 including the CPU 12 is used for the sequential control, the present invention may also be constituted so that the control part 10 performs the switching and the configuration processing of the FPGAs 40 and 41 based on the detection of a failure.

(4) Although in the above-mentioned embodiments the control part 10 including the CPU 12 is used for the sequential control, the present invention may also be constituted so that the control part 10 performs the periodic switching and the configuration processing of the FPGAs 40 and 41.

Although the best mode for carrying out the invention, the object, the configuration and the operation and effect have been described in detail above, the invention is not limited to such embodiment for carrying out the invention, and it is a matter of course that the invention can be variously changed or modified by a person skilled in the art on the basis of a gist and split of the invention as disclosed in claims and the detailed description of the invention, and such a change or modification, and various conjectured configurations, modified examples and so forth are included in the scope of the invention, and the description of the specification and drawings are not restrictively understood.

The entire disclosure of Japanese Patent Application No. 2004-236803 including specification, claims, drawings and summary are incorporated herein by reference in its entirety.

What is claimed is:

1. A functional device, comprising:
    a plurality of function parts that carry out a necessary circuit function by circuit information written therein;
    a failure detection part that detects a failure of a function part under operation; and
    a switching part that switches from the function part, in which a failure is occurring, to a function part under stand-by based on detection of the failure by said failure detection part, and that switches periodically between the function part under operation and the function part under stand-by.

2. The functional device of claim 1 further comprising a function recovery part that makes the function of said function part with said failure recover.

3. A functional device, comprising:
    a plurality of function parts that carry out a necessary circuit function by circuit information written therein;
    a switching timing detection part that detects switching timing for the purpose of switching periodically from a function part under operation to a function part under stand-by; and
    a switching part that switches periodically between said function part under operation and the function part under stand-by based on said switching timing detected by the switching timing detection part.

4. The functional device of claim 1 further comprising a rewriting part that rewrites said circuit information into said function part under stand-by.

5. A functional device, comprising:
    a plurality of function parts that carry out a necessary function by circuit information written therein;
    a failure detection part that detects a failure of a function part under operation out of these function parts;
    a switching timing detection part that detects switching timing for the purpose of switching periodically from the function part under operation to a function part under stand-by out of said function parts; and
    a switching part that switches periodically to make said function part under operation stand by and make the function part under stand-by operate every time said switching timing comes, and that switches from the function part, in which a failure is occurring, to the function part under stand-by based on detection of said failure.

6. A functional device, comprising:
    a plurality of function parts that carry out a necessary function by circuit information written therein;
    an input data maintaining part that maintains input data given to said function parts temporarily;
    an input switching part that switches input of said input data toward said function parts so that said input data maintained in said input data maintaining part is given to a function part under operation out of said function parts;
    an output switching part that switches taking-out of output data so that the output data is taken out from said function part under operation; and
    an output data maintaining part that maintains temporarily said output data taken out from said function part under operation.

7. The functional device of claim 6 further comprising a failure detection part that detects a failure of said function part under operation, either said input switching part or said output switching part being switched or both of them being switched based on detection of the failure by said failure detection part.

8. A function maintaining method, including:
    processing that selects at least one function part from a plurality of function parts carrying out a necessary function by circuit information written therein and makes it operate;
    processing that detects a failure of said function part under operation; and
    processing that switches from the function part, in which a failure is occurring, to a function part under stand-by based on detection of said failure, and that switches periodically between the function part under operation and the function part under stand-by.

9. The function maintaining method of claim 8 further including processing that recovers the function of said function part in which the failure is occurring.

10. A function maintaining method, including:
   - processing that selects at least one function part from a plurality of function parts carrying out a necessary function by circuit information written therein and makes it operate;
   - processing that detects switching timing for the purpose of switching periodically from the function part under operation to a function part under stand-by out of these function parts; and
   - processing that makes said function part under operation stand by and makes the function part under stand-by operate, periodically, based on said switching timing.

11. A function maintaining method, comprising:
   - processing that selects at least one function part from a plurality of function parts carrying out a necessary function by circuit information written therein and makes it operate;
   - processing that detects a failure of said function part under operation;
   - processing that detects switching timing for the purpose of switching periodically from said function part under operation to a function part under stand-by;
   - processing that switches periodically to make said function part under operation stand by and make the function part under stand-by operate every time said switching timing comes; and
   - processing that switches from the function part, in which a failure is occurring, to the function part under stand-by based on detection of said failure.

12. A function maintaining method, including:
   - processing that selects at least one function part from a plurality of function parts carrying out a necessary function by circuit information written therein and makes it operate;
   - processing that maintains temporarily input data given to said function part under operation;
   - processing that maintains temporarily output data taken out from said function part under operation; and
   - processing that switches periodically between said function part under operation and the function part under stand-by.

13. A function maintaining program which makes a computer execute the following steps, including:
   - selecting at least one function part from a plurality of function parts carrying out a necessary function by circuit information written therein and makes it operate;
   - taking in information representative of a failure which occurs in said function part under operation;
   - switching from said function part under operation, in which the failure is occurring, to a function part under stand-by; and
   - switching periodically between the function part under operation and the function part under stand-by.

14. The function maintaining program of claim 13 further including a step that makes the function of said function part, in which said failure is occurring, recover.

15. A function maintaining program which makes a computer execute the following steps, including:
   - selecting at least one function part from a plurality of function parts carrying out a necessary function by circuit information written therein and makes it operate;
   - taking in switching timing for the purpose of switching periodically from the function part under operation to a function part under stand-by out of these function parts; and
   - making said function part under operation stand by and makes the function part under stand-by operate, periodically, based on said switching timing.

16. A function maintaining program which makes a computer execute the following steps, including:
   - selecting at least one function part from a plurality of function parts carrying out a necessary function by circuit information written therein and makes it operate;
   - taking in information representative of a failure which occurs in said function part under operation;
   - detecting switching timing for the purpose of switching periodically from said function part under operation to a function part under stand-by;
   - switching periodically to make said function part under operation stand by and make the function part under stand-by operate every time said switching timing comes; and
   - switching from the function part, in which a failure is occurring, to the function part under stand-by based on detection of said failure.

17. A computer program product containing a function maintaining program recorded on a computer readable storage medium, the program comprising the steps of:
   - selecting at least one function part from a plurality of function parts carrying out a necessary function by circuit information written therein and makes it operate;
   - taking in information representative of a failure which occurs in said function part under operation;
   - switching from said function part under operation, in which the failure is occurring, to a function part under stand-by;
   - switching periodically between the function part under operation and the function part under stand-by.

18. The program product of claim 17 further including a step that makes the function of said function part, in which said failure is occurring, recover.

19. A computer program product containing a function maintaining program recorded on a computer readable storage medium, the program comprising the steps of:
   - selecting at least one function part from a plurality of function parts carrying out a necessary function by circuit information written therein and makes it operate;
   - taking in switching timing for the purpose of switching periodically from the function part under operation to a function part under stand-by out of these function parts; and
   - making said function part under operation stand by and makes the function part under stand-by operate, periodically, based on said switching timing.

20. A computer program product containing a function maintaining program recorded on a computer readable storage medium, the program comprising the steps of:
   - selecting at least one function part from a plurality of function parts carrying out a necessary function by circuit information written therein and makes it operate;
   - taking in information representative of a failure which occurs in said function part under operation;
   - detecting switching timing for the purpose of switching periodically from said function part under operation to a function part under stand-by;
   - switching periodically to make said function part under operation stand by and make the function part under stand-by operate every time said switching timing comes; and
   - switching from the function part, in which a failure is occurring, to the function part under stand-by based on detection of said failure.

* * * * *